United States Patent
Yochai et al.

(10) Patent No.: US 7,558,919 B1
(45) Date of Patent: Jul. 7, 2009

(54) DYNAMIC CACHE PARTITIONING

(75) Inventors: Yechiel Yochai, Lincoln, RI (US); David Shadmon, Newton, MA (US); Josef Ezra, Ashland, MA (US); Amnon Naamad, Brookline, MA (US); Lee W. Sapiro, Hudson, MA (US); Orit Levin-Michael, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 234 days.

(21) Appl. No.: 11/254,089

(22) Filed: Oct. 19, 2005

(51) Int. Cl.
*G06F 12/02* (2006.01)
(52) U.S. Cl. ........................... 711/129; 711/173
(58) Field of Classification Search ............... 711/170, 711/129
See application file for complete search history.

(56) References Cited

U.S. PATENT DOCUMENTS

| | | | |
|---|---|---|---|
| 5,206,939 A | 4/1993 | Yanai et al. | |
| 5,381,539 A | 1/1995 | Yanai et al. | |
| 5,592,432 A | 1/1997 | Vishlitzky et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,807,619 B1 * | 10/2004 | Ezra et al. | 711/219 |
| 7,246,187 B1 * | 7/2007 | Ezra et al. | 710/200 |

* cited by examiner

*Primary Examiner*—Hyung S Sough
*Assistant Examiner*—Hamdy S Ahmed
(74) *Attorney, Agent, or Firm*—Muirhead and Saturnelli, LLC

(57) ABSTRACT

Described are techniques for determining a cache slot. A set of criteria for each of a plurality of families is received. A received data operation associated with a first of said plurality of families is obtained. It is determined, in accordance with the criteria associated with the received data operation, whether to allocate a cache slot in the cache for the received data operation. The criteria for the first family includes a minimum value and a maximum value used in determining a cache partition size range for the first family. The maximum value is used in determining a maximum cache partition size allowable for the first family.

20 Claims, 17 Drawing Sheets

DYNAMIC CACHE PARTITIONING

BACKGROUND

1. Technical Field

This application generally relates to caching, and more particularly to techniques used in connection with cache partitioning.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Performance of a storage system may be improved by using a cache. In the case of a disk drive system, the cache may be implemented using a block of semiconductor memory that has a relatively lower data access time than the disk drive. Data that is accessed is advantageously moved from the disk drives to the cache so that the second and subsequent accesses to the data may be made to the cache rather than to the disk drives. Data that has not been accessed recently may be removed from the cache to make room for new data. Often such cache accesses are transparent to the host system requesting the data.

One technique for implementing a cache is to store the data in blocks and link each of the blocks together in a doubly linked ring list referred to herein as a replacement queue. Each block of the replacement queue represents a block of data from a logical disk unit. The blocks or slots are placed in the doubly linked ring list in the order in which they are retrieved from the disk. A pointer may point to the block that was most recently added to the list. Thus, when a new block is to be added to the cache within the replacement queue, the structure of the replacement queue, in combination with the head pointer, may be used to determine the oldest block in the replacement queue that is to be removed to make room for the new block. An implementation of the replacement queue may use both a "head" pointer and a "tail" pointer identifying, respectively, the beginning and end of the replacement queue. The "tail" may determine the oldest block or slot in the replacement queue. Two such pointers may be used in an replacement queue arrangement as it may be desirable in accordance with cache management schemes in which some data may remain permanently in the cache and the "oldest" and "newest" data may not be adjacent to one another.

Cache management techniques are described, for example, in issued U.S. Pat. No. 5,381,539, Jan. 10, 1995, entitled "System and Method for Dynamically Controlling Cache Management", Yanai et al., assigned to EMC Corporation of Hopkinton, Mass., which is herein incorporated by reference, in which a data storage system has a cache controlled by parameters including: (a) a minimum number of data storage elements which must be retrieved and stored in cache memory and used by the system before the cache management system recognizes a sequential data access in progress; (b) the maximum number of tracks or data records which the cache management system is to prefetch ahead; and (c) the maximum number of sequential data elements to be stored in cache before the memory containing the previously used tracks or data records are reused or recycled and new data written to these locations. The cache memory is in a least-recently used circular configuration in which the cache management system overwrites or recycles the oldest or least recently used memory location. The cache manager provides monitoring and dynamic adjustment of the foregoing parameters.

Described in issued U.S. Pat. No. 5,592,432, Jan. 7, 1997, entitled "Cache Management System Using Time Stamping for Replacement Queue", Vishlitzky et al., which is herein incorporated by reference, is a system that includes a cache directory listing data elements in a cache memory and a cache manager memory including a replacement queue and data structures. A cache manager determines which data element should be removed or replaced in the cache memory based on the elapsed time the data element has been in the memory. If the elapsed time is less than a predetermined threshold, the data element will be maintained in the same location in the replacement queue saving a number of cache management operations. The predetermined threshold is established as the average fall through time (FTT) of prior data elements in the memory. A modified least-recently-used replacement procedure uses time stamps indicating real or relative time when a non-write-pending data element was promoted to the tail of the replacement queue, the most-recently used position. Also disclosed is another embodiment in which the number of times the data element is accessed while in the memory is compared to a fixed number. If the data element has been accessed more than the fixed number, it is placed at the tail of the replacement queue ensuring a longer period for the data element in the memory.

Described in U.S. Pat. No. 5,206,939, Apr. 27, 1993, entitled "System and Method for Disk Mapping and Retrieval", Yanai et al, which is herein incorporated by reference, is a device-by-device cache index/directory used in disk mapping and data retrieval.

Data may be stored in a cache in order to increase efficiency. However, there can be a cost associated with performing cache management operations, such as storing and retrieving data from the cache, finding an available cache slot, and the like.

Thus, it may be desirous and advantageous to have a cache management scheme which is efficient and flexible for facilitating use of the cache.

SUMMARY OF THE INVENTION

In accordance with one aspect of the invention is a method for determining a cache slot comprising: receiving a set of criteria for each of a plurality of families; obtaining a received data operation associated with a first of said plurality of families; and determining, in accordance with said criteria associated with said received data operation, whether to allocate a cache slot in said cache for said received data operation, said criteria for said first family including a minimum value and a maximum value used in determining a cache partition size range for said first family, said maximum value used in determining a maximum cache partition size allowable for said first family. The method may also include determining, in accordance with a type of operation associated with said received data operation and a first threshold, whether to allocate a cache slot for the received data operation, said first threshold being determined as a percentage of a minimum cache partition size determined using said minimum value. The received data operation may specify a write operation. The criteria may also include at least one of: a maximum usability period parameter, and a priority, said maximum usability period parameter indicating a value used in determining how long data of a cache slot remains in cache, and a priority of a family indicating a relative family priority with respect to other families. The cache may be divided into groups of extents of cache slots, processing being performed on each of said extents to determine whether a cache slot may be obtained for use from said each extent for said received data operation, a cache slot being in one of a plurality of associated states, said associated states including a first state wherein the data in the cache slot is invalid and the cache slot is indicated as available, a second state wherein the data in the cache slot is valid and non-volatile and the cache slot is available, and the method may further comprise for a current extent: determining whether any cache slot in said current extent is in said first state; if no cache slot is in said first state and one or more cache slots in said current extent are in said second state, selecting a cache slot, from said one or more cache slots in said second state, in accordance with said criteria of said first family. The selecting from said one or more cache slots in said current extent which are in said second state in accordance with said criteria of said first family may further comprise determining, in accordance with said maximum cache partition size for said first family of said received data operation, whether to allocate a cache slot for said received data operation. If a number of cache slots currently allocated for said first family associated with said received data operation is over a maximum value in accordance with said maximum cache partition size, an oldest cache slot in the second state included in the first family may be selected for use with the received data operation. If a number of cache slots currently allocated for said first family associated with said received data operation is not over a maximum value in accordance with said maximum cache partition size, said method may further comprise: determining an oldest cache slot in said second state for each family; determining, in accordance with said maximum usability period parameter for each family, whether any oldest cache slot for each family is available for use with said received data operation. If there are no oldest cache slots for each family available for use as determined in accordance with said maximum usability period parameter for each family, the method may further comprise: determining which families have more cache slots currently allocated than a minimum number of cache slots associated with each family as specified using said minimum cache partition size for each family; and for each family having more cache slots currently allocated than said minimum number associated with each family, determining an oldest cache slot from said each family. If a plurality of families currently have more than the associated family minimum number of cache slots allocated, one cache slot from the oldest cache slots as determined for each of said plurality of families may be selected using the priority for each family. If one cache slot is determined as available for use in accordance with said maximum usability period parameter for each family, said one cache slot may be used, and if a plurality of cache slots are available in accordance with said maximum usability period parameter for each family, one cache slot may be selected from said plurality of cache slots using said priority associated with each family. One of said criteria of at least one of said plurality of families may be changed from are a first value to a second different value, said first value and said second value being specified at different points in time during operation of a system utilizing said cache. A state of each cache slot may be determined in accordance with a tag associated with said each cache slot, each extent including a control slot comprising tags for all cache slots in said each extent.

In accordance with another aspect of the invention is a computer program product for determining a cache slot comprising code that: receives a set of criteria for each of a plurality of families; obtains a received data operation associated with a first of said plurality of families; and determines, in accordance with said criteria associated with said received data operation, whether to allocate a cache slot in said cache for said received data operation, said criteria for said first family including a minimum value and a maximum value used in determining a cache partition size range for said first family, said maximum value used in determining a maximum cache partition size allowable for said first family. The received data operation may specify a write operation, and the computer program product may further comprise code that: determines, in accordance with a type of operation associated with said received data operation and a first threshold, whether to allocate a cache slot for the received data operation, said first threshold being determined as a percentage of a minimum cache partition size determined using said minimum value. The criteria may further include at least one of: a maximum usability period parameter, and a priority, said maximum usability period parameter indicating a value used in determining how long data of a cache slot remains in cache, and a priority of a family indicating a relative family priority with respect to other families. The cache may be divided into groups of extents of cache slots, processing being performed on each of said extents to determine whether a cache slot may be obtained for use from said each extent for said received data operation, a cache slot being in one of a plurality of associated states, said associated states including a first state wherein the data in the cache slot is invalid and the cache slot is indicated as available, a second state wherein the data in the cache slot is valid and non-volatile and the cache slot is available, the computer program product may further comprise code which performs for a current extent: determining whether any cache slot in said current extent is in said first state; if no cache slot is in said first state and one or more cache slots in said current extent are in said second state, selecting a cache slot, from said one or more cache slots in said second state, in accordance with said criteria of said first family; and wherein, said selecting from said one or more cache slots in said current extent which are in said second state in accordance with said criteria of said first family may further comprise code that: determines, in accordance with said maximum cache partition size for said first family of said received data operation, whether to allocate a cache slot for said received data operation. If a number of cache slots currently allocated for said first family associated with said received data operation is not over a maximum value in accordance with said maximum cache partition size, said computer program product may further comprising code that: determines an oldest cache slot in said second state for each family; determines, in accordance with said maximum usability period parameter for each family, whether any oldest cache slot for each family is available for use with said received data operation; and wherein, if there are no oldest cache slots for each family available for use as determined in accordance with said maximum usability period parameter for each family, the computer program product may further comprise code that: determines which families have more cache slots currently allocated than a minimum number of cache slots associated with each family as specified using said minimum cache partition size for each family; and for each family having more cache slots currently allocated than said minimum number associated with each family, determines an oldest cache slot from said each family; and wherein, if a plurality of families currently have more than the associated family minimum number of cache slots allocated, one cache slot may be selected, using said priority for each family, from the oldest cache slots as determined for each of said plurality of families.

In accordance with another aspect of the invention is a data storage system comprising code stored on a computer-readable medium for dynamically partitioning a cache, said computer-readable medium comprising code that: receives a set of one or more criteria for each of one or more families, each of said one or more families being associated with each request for a cache slot, wherein, in the event there are no free cache slots, a cache slot is designated as a candidate for use with each request for a cache slot by making available those cache slots which include valid, non-volatile data and which are selected from one or more of the families in accordance with at least one of the following criteria associated with each family: a first parameter used in determining a maximum amount of cache slots included in said cache for use by each of said one or more families in accordance with a first parameter for each of said families, a second parameter used in determining a minimum amount of cache slots being included in said cache for use by each of said one or more families in accordance with a second parameter for each of said families, a third parameter specifying a maximum usability period indicating an amount of time that a cache slot including valid, non-volatile data associated with said each family remains in cache such that after said amount of time has lapsed, said cache slot may be designated as a candidate used in connection with other cache slot requests, and a priority indicating a relative family priority with respect to other families. The data storage system may includes said cache which is organized into groups of extents of cache slots, and the data storage system may further comprise code that: receives a data operation request causing a request for a cache slot; and processes a first of said extents to determine whether a cache slot may be obtained for use from said first extent for said data operation request, information about the state of data associated with each cache slot is stored in a tag associated with said each slot, each of said extents including a control slot comprising tags for all cache slots in said each extent.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
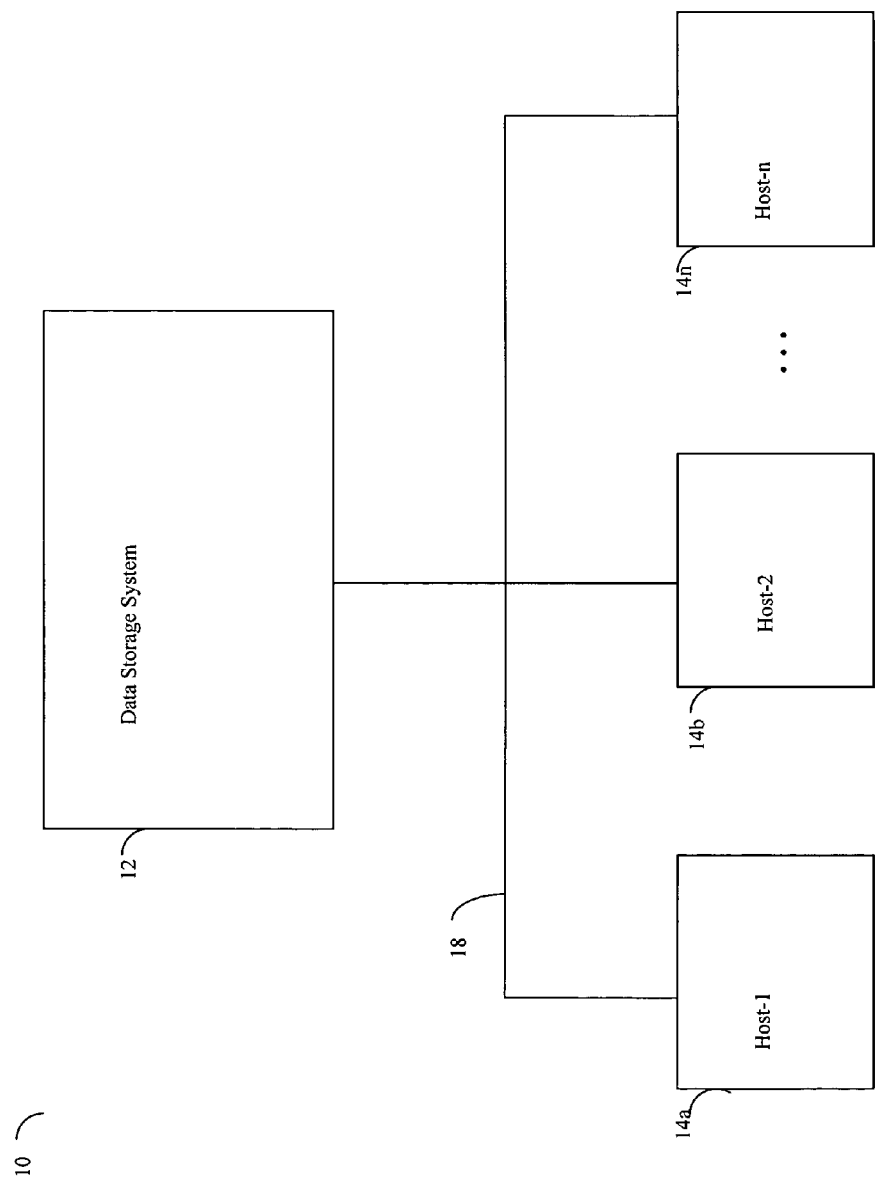
FIG. 1 is an example of an embodiment of a computer system that may utilize the techniques described herein.

Referring now to FIG. 1, shown is an example of an embodiment of a computer system that may be used in performing the techniques described herein. The computer system 10 includes a data storage system 12 connected to host systems 14a-14n through communication medium 18. In this embodiment of the computer system 10 and the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
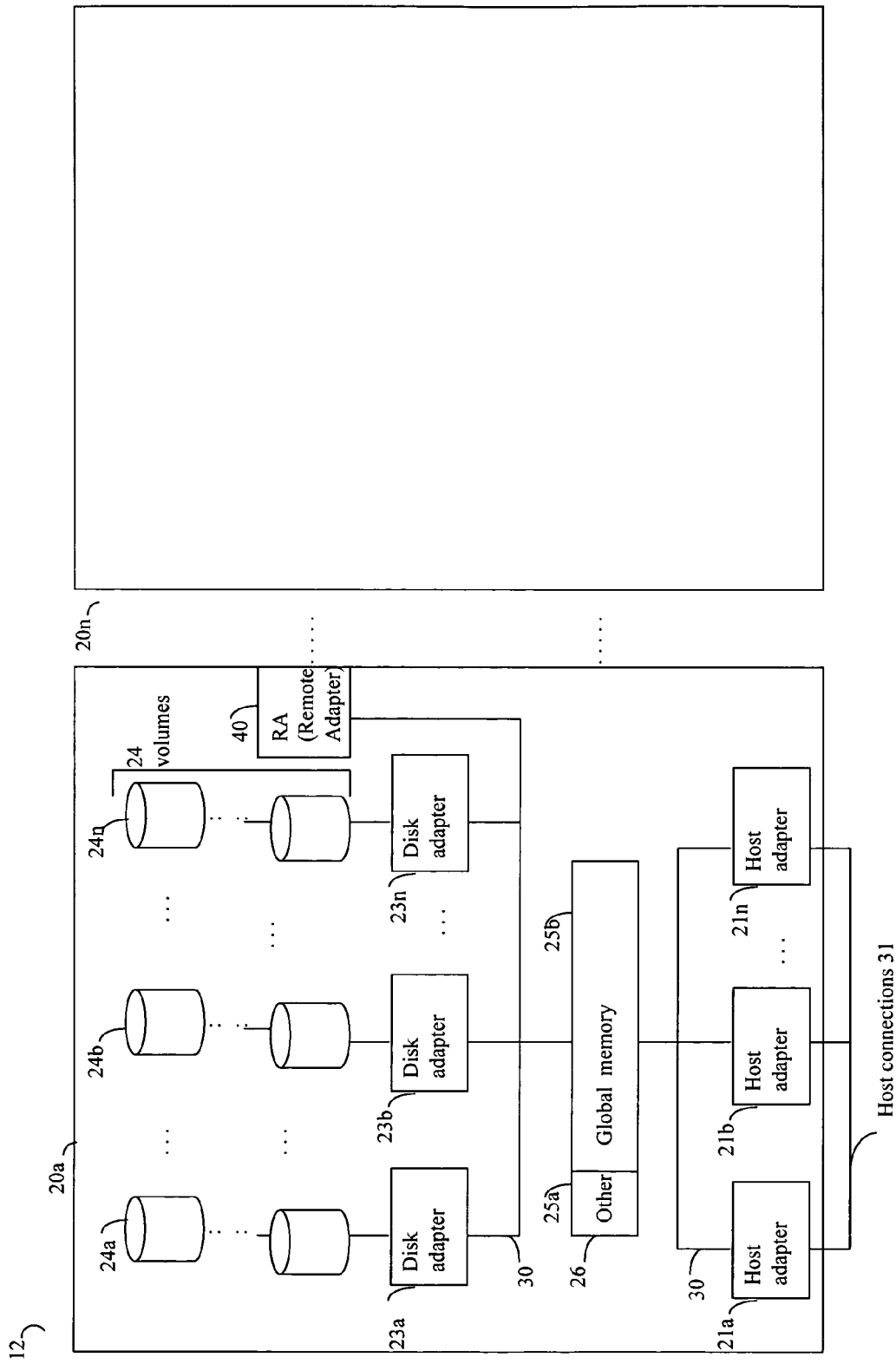
FIG. 2A is an example of an embodiment of a data storage system.

Referring now to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on an LV may be accessed by the DA following a data request in connection with I/O operations that other directors originate.

Figure 2B:
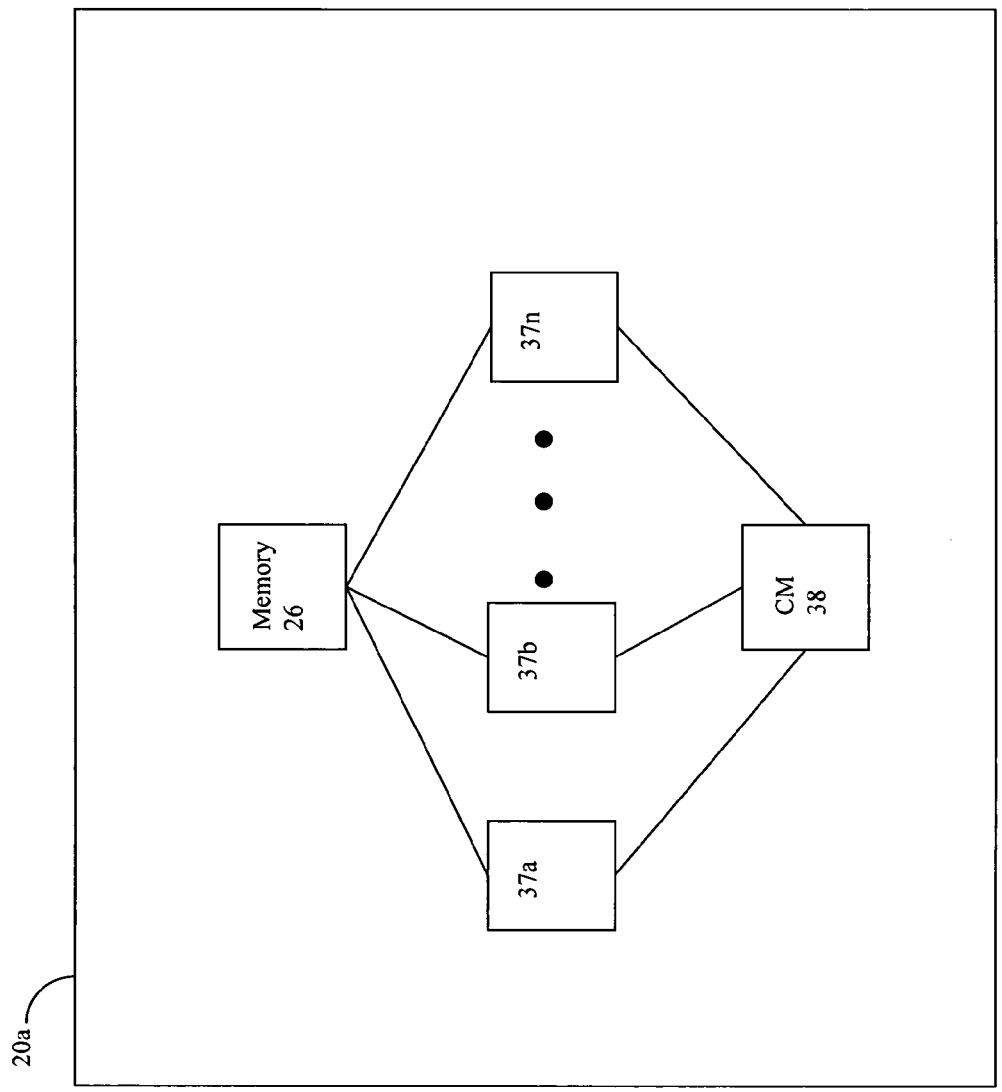
FIG. 2B is a representation of the logical internal communications between the directors and memory included in one embodiment of data storage system of FIG. 2A.

Referring now to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to 64 directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

As described above, an embodiment may include a cache in the global memory portion 25b of FIG. 2A. An embodiment may include a replacement queue arrangement including the cache slots included in the cache. What will now be described is an example of a cache structure that may be utilized in an embodiment.

Figure 3:
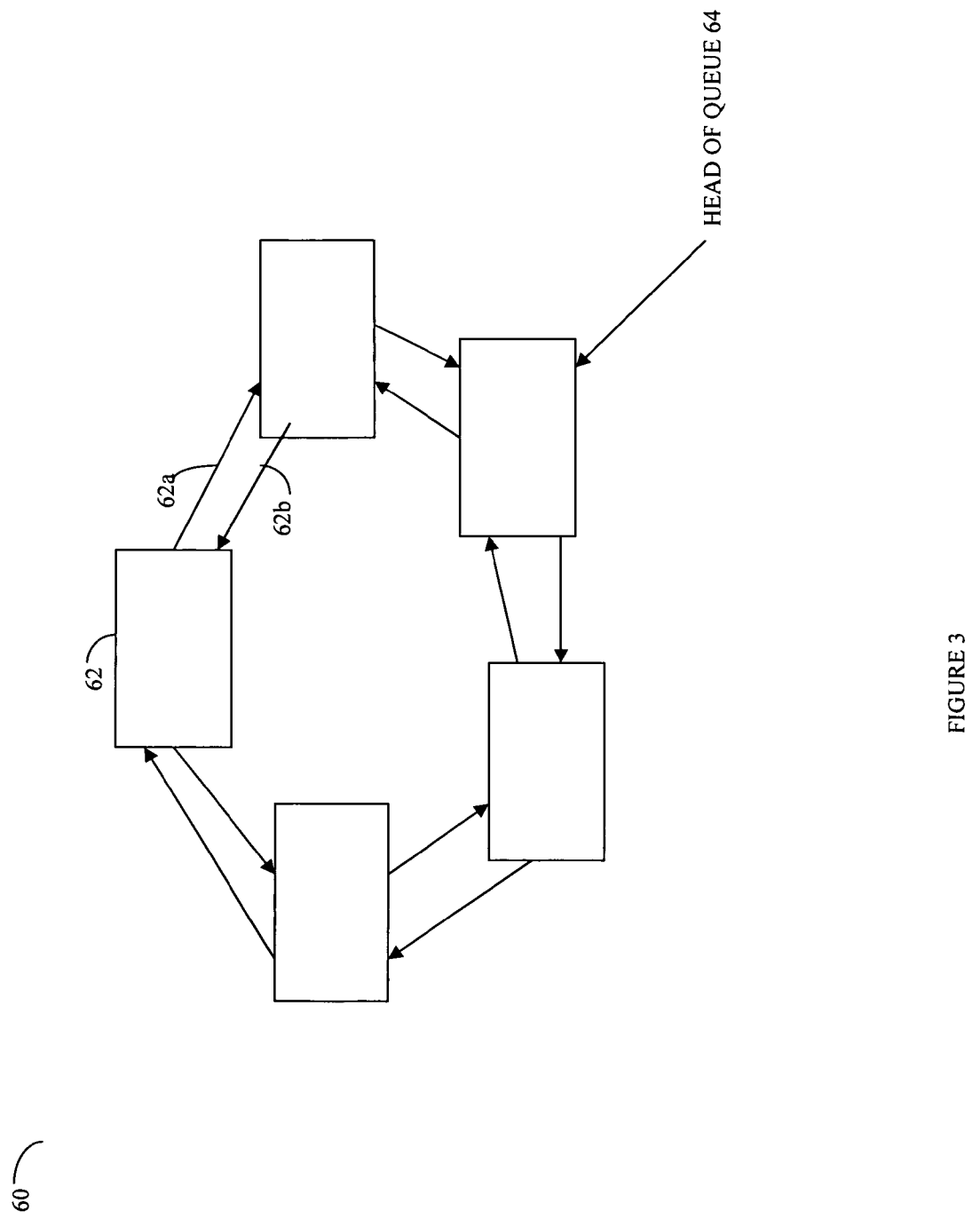
FIG. 3 is an example of an embodiment of a replacement queue.

Referring now to FIG. 3, shown is an example of an embodiment 60 of a replacement queue. Shown in the representation 60 is a circular structure in which each of the elements, such as 62, corresponds to a cache slot. Each cache slot may correspond to a portion of memory, such as one or more memory blocks. Each memory block may correspond to, for example, a track on one of the drives shown in connection with FIG. 2. In this representation, each of the slots are connected to other slots by forward and backward pointers, such as 62a and 62b, in a doubly linked list arrangement. Additionally, the head or beginning of the replacement queue is designated by a head pointer 64.

It should be noted that as described herein, an embodiment may include a cache which is in the form of the replacement queue using doubly linked list or other data structures known to those of ordinary skill in the art. The replacement queue described herein should not be construed as a limitation to the techniques described herein. What is elsewhere herein in more details are techniques that may be utilized in connection with a variety of different cache structures and may be utilized in connection with determining which slots remain in the cache, which ones are removed, and when one are selected for use for particular data requests.

Figure 4:
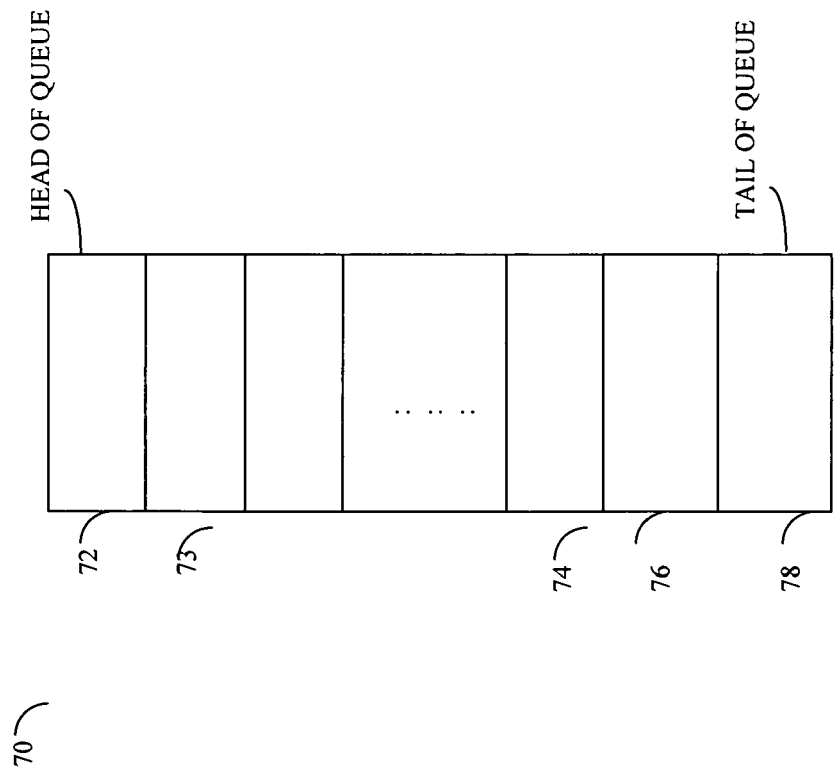
FIG. 4 is an equivalent logical representation of the replacement queue of FIG. 3.

Referring now to FIG. 4, shown is an equivalent representation 70 of the previously described replacement queue 60 in connection with FIG. 3. The representation shown in FIG. 4 is a logical equivalent of the representation shown in FIG. 3. The representation 70 of FIG. 4 logically corresponds to that in FIG. 3 such that, for example, element 72 corresponds to the beginning cache slot as noted by the head of the replacement queue pointer 64 in connection with the previously described figure. Similarly, the last element of the replacement queue is denoted by slot 78 which in this example is labeled also as the tail of the replacement queue. Elements or slots may be inserted into the list at the head of the replacement queue and exit or leave the cache at the tail of the replacement queue. For example, when an element is deposited into the cache, it may be placed at the head of the replacement queue in slot location denoted by 72 in connection with a read operation. Additional elements may be progressively added to the head portion or other location within the replacement queue 72. As elements are added to the queue, subsequent elements progress toward the tail of the list. When another slot is added to the replacement queue at position 72, the slot currently at position 72 moves to that slot designated as position 73 and the newly added element falls into the position of element 72.

An element may be placed in the replacement queue, for example, when an element is referenced in connection with an I/O operation such as a cache miss for a read operation, or in connection with processing pending write operations, for example. Once in the replacement queue, an element progresses through the replacement queue from the head 72 towards the tail 78 of the replacement queue.

The foregoing queue arrangement in connection with a cache or shared memory may have drawbacks. For example, exclusive access to the queue may be implemented using a locking mechanism that only allows a single process to access the entire queue. Additionally, pointer manipulation in connection with performing management operations may also be expensive. As will be described elsewhere herein, other cache arrangements may be used other than as illustrated in FIG. 3. Additionally, other embodiments may indicate a state of each cache slot in different ways. For example, in connection with the structure of FIG. 3, as cache slots are used for storing data therein, the slots may be removed from the cache structure by pointer manipulation. Other cache structures may indicate the state of particular cache slots using other techniques that may vary in accordance with the cache structure.

Figure 5:
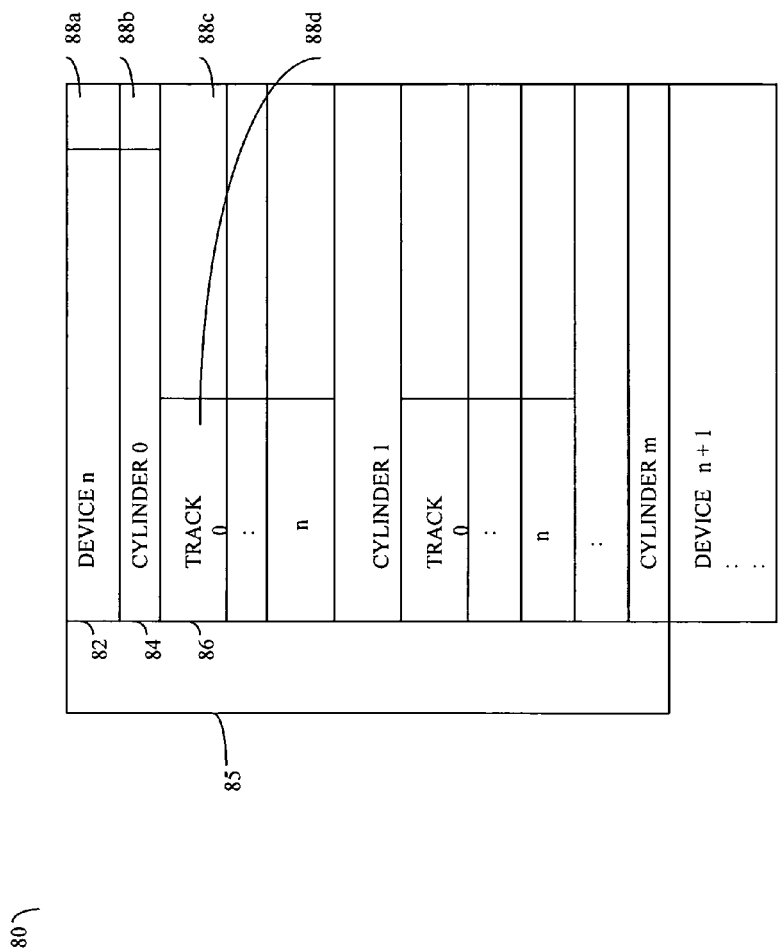
FIG. 5 is an example of a representation of a cache index/directory table.

To indicate the data from a device that is stored in the cache as illustrated in FIG. 3 and other cache structures known to those of ordinary skill in the art and described herein, a cache index or directory may be used. An embodiment may implement the cache index or directory using any one of a variety of different arrangements and structures. FIG. 5 shows one particular representation illustrating a device-by-device cache mapping.

Referring now to FIG. 5, shown is an example of a representation of a cache index/directory table. The table 80 may be organized on a device-by-device level to indicate for a particular portion of a device, is the portion in cache, and if so, where in cache is it located. An embodiment that includes devices, for example, such as disks, may include a further refinement or granularity in the table 80 corresponding to a location in cache.

The table 80 may include a hierarchical structure relative to the structure of a disk, such as cylinders and tracks on a disk. Each device, such as device n, may have a corresponding portion 85 included in the table. Each of the portions 85 may further be divided into sections in accordance with the disk structure. A portion 85 may include device header information 82, information for each cylinder 84 and for each track within each cylinder 86. For a device, a bit indicator 88a may indicate whether data associated with the device is stored in cache. The bit indicator 88b may further indicate for a particular cylinder within a device, is any data stored in the cache. Associated with each track may be a corresponding portion 88c indicating whether data associated with a particular track is in the cache and an associated address of where in the cache the data for a particular track may be found, for example, in connection with performing a read operation or a pending write operation. The portion 88d may include other information associated with a particular track, such as a valid cache address if data is stored in the cache for the particular track.

Figure 6:
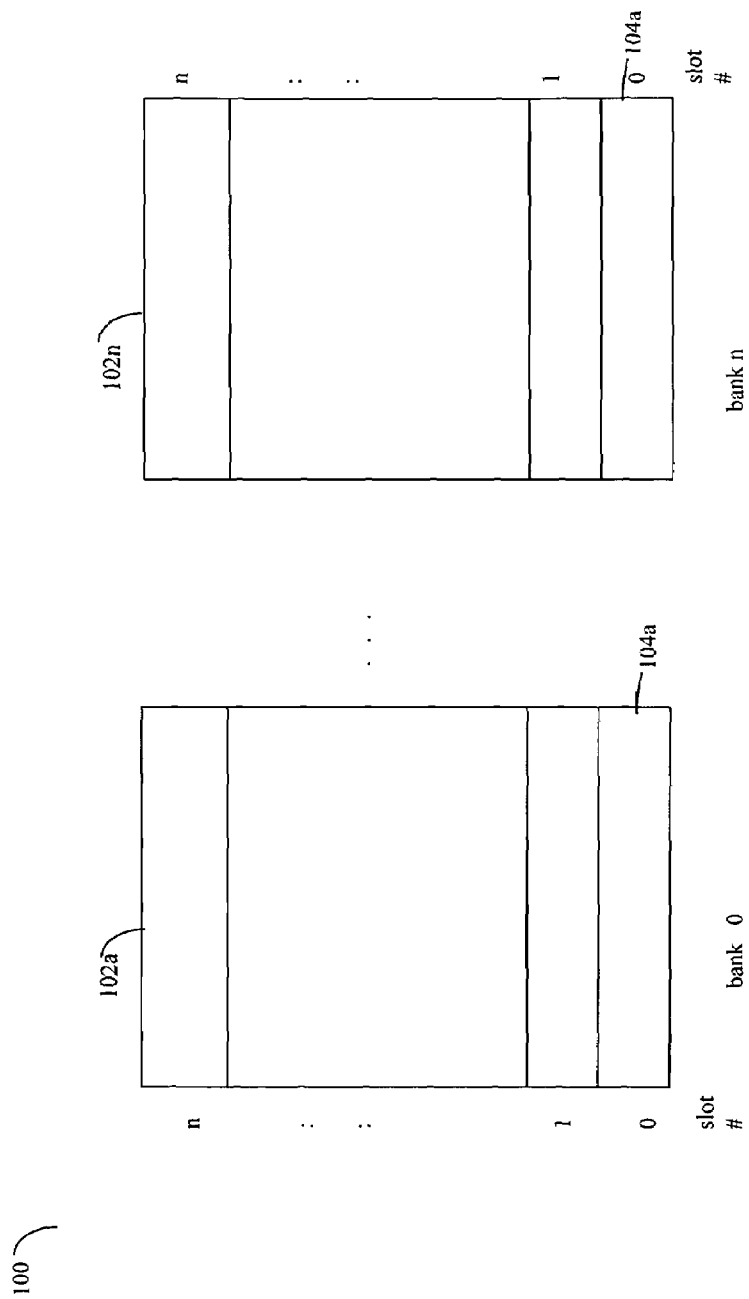
FIG. 6 is an example of another representation of a cache structure than may be used with the techniques described herein.

Referring now to FIG. 6, shown is an example of another representation of a cache in another embodiment. In this illustration, the cache 100 is organized into memory banks 102a-102n corresponding, respectively, to bank 0 through n. Each memory bank may be further divided into slots. Each memory bank, such as 102a, may include a control slot, such as 104a that includes information regarding the slots included in the respective memory bank.

It should be noted that the cache index or directory as shown in FIG. 5, for example, may be used in connection with any one or more of a variety of different cache arrangements, such as those in FIG. 3 as well as FIG. 6.

Figure 7:
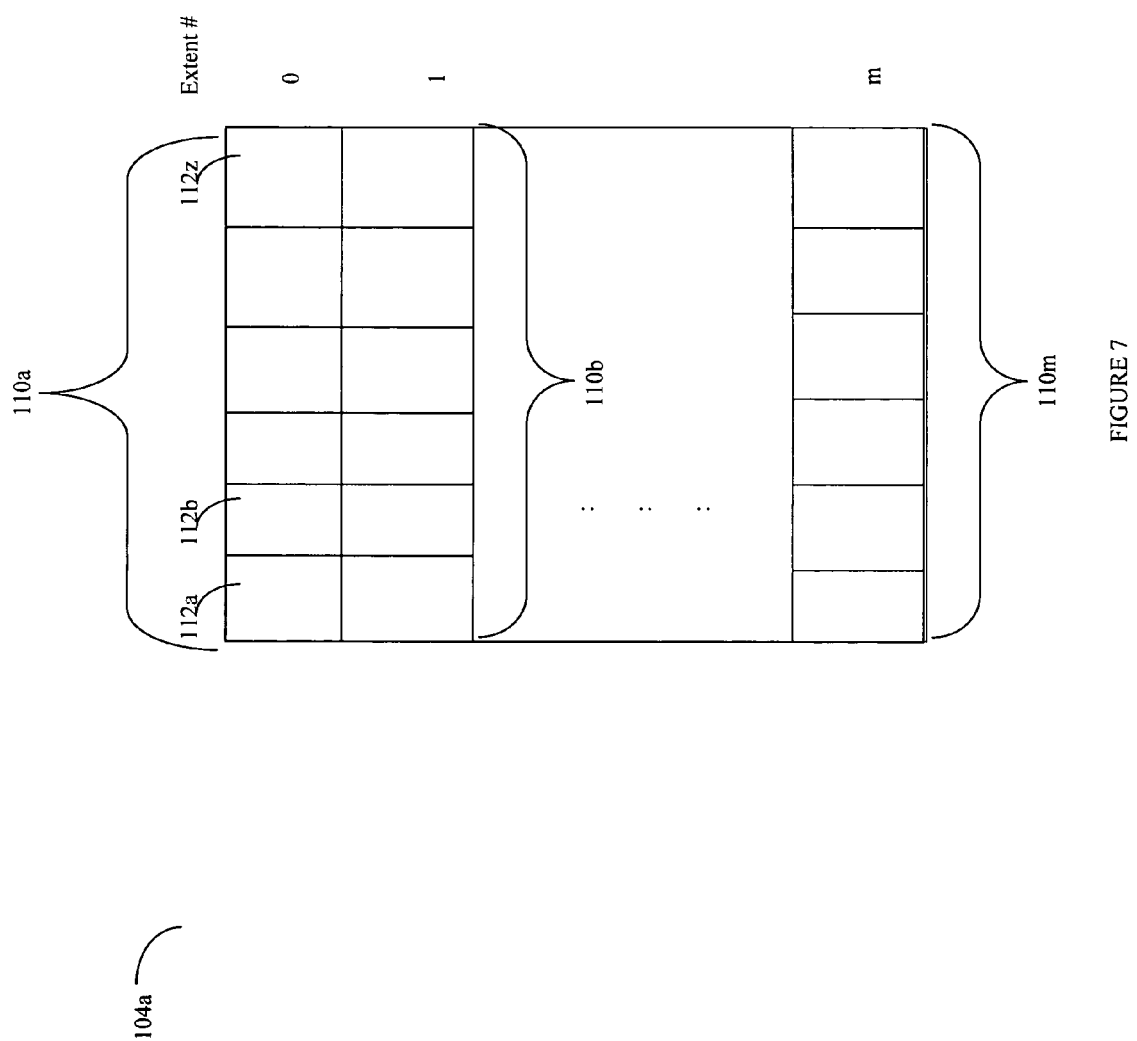
FIG. 7 is an example of a more detailed description of a control slot.

Referring now to FIG. 7, shown is a more detailed description of the control slot 104a from FIG. 6. The control slot 104a may include information about the other slots in the memory bank. In this example, the control slot 104a may be further divided into extents or groups of tags, such as 110a-110m. Other slots in the memory bank 102a that includes control slot 104a may have a corresponding tag, such as 112a. In one embodiment, the tag size selected is 32 bits. However, other tag sizes may be used in other embodiments. The tag may include information about the associated cache slot and is described in more detail in following paragraphs.

Each extent, such as 110a-110m, may refer to a number of tags that may vary in accordance with each embodiment. In one embodiment, the number of tags in an extent is the number of tags which may be read in a single direct memory access (DMA), for example, by a DA. Each chunk or portion may include, for example, 120 or 82 tags. Other numbers of tags may be associated with a single chunk or portion that may vary in accordance with each embodiment.

An embodiment may store the cache directory or table, cache, or portions thereof in global memory, for example, as included in FIG. 2A for a particular data storage system. Once in global memory, a DA may perform a DMA (direct memory access) and obtain a copy of a portion of the tags. The portion of the tags may be placed on another portion of memory local to the DA and utilization of this local copy is described in following paragraphs.

Figure 8:
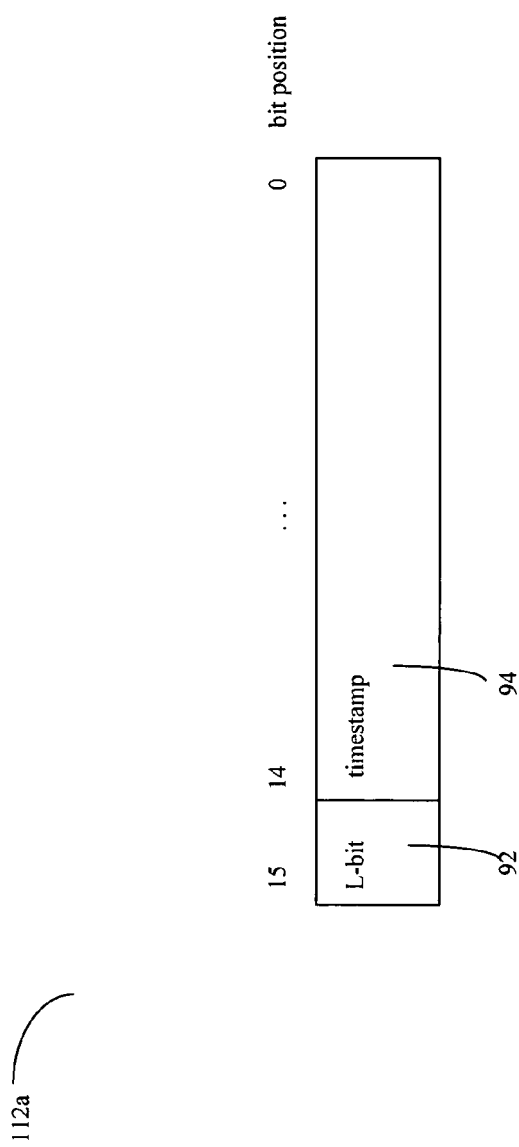
FIG. 8 is a more detailed representation of a tag.

Referring now to FIG. 8, shown is a more detailed representation of a tag 112a as included in FIG. 7. The 2 byte tag 112a includes an L-bit 92 and a 15 bit time stamp value 94. The L-bit, which may be the upper bit in the 2-byte tag arrangement, may be used to indicate the availability of a cache slot associated with the particular tag. This L-bit may be used in connection with obtaining a cache slot as may be needed in connection with performing different operations such as, for example, in connection with processing a received I/O request. The time stamp value indicates, within a particular resolution, such as ½ second, when the associated slot was last used. For example, when there is a cache "hit" to a particular slot, the associated time stamp may be updated with a new time stamp value.

An embodiment may determine which slot to use in accordance with any one or more different criteria, as will be described in more detail elsewhere herein. For example, a technique may determine which slot to use by considering criteria including the age of a slot as represented by the associated time stamp. An embodiment may also represent the state of a slot, and data that may be included therein, using any one or more different techniques. In one embodiment, a first state may correspond to a cache slot that may not include any valid data and may be a candidate for use when a new slot is needed. A second state may correspond to a cache slot including valid data and the cache slot includes volatile data, such as a latest version of data associated with a pending write operation that has not yet been written out to the physical device. A cache slot in this second state may not be considered as a candidate for use in connection with a request. A cache slot including valid data may correspond to a third state in which the cache slot is considered a candidate for use if the cache slot includes nonvolatile, but valid, data for example, representing the state of a cache slot after the pending write operation's data is written out to the device. In connection with selecting cache slots for use in connection with a data operation, cache slots of the first state, if any, may be selected. If no cache slots are in the first state, any one or more different techniques may be used in connection with selection of a cache slot from other candidates. Such techniques are described herein in more detail. In representing each of the foregoing states, any one or more different techniques may be used. For example, an embodiment may use a special time stamp value to indicate that a tag corresponds to a slot which is in the first state wherein the cache slot is a candidate for use and includes data that is invalid or not relevant. As will be described in more detail in connection with techniques described herein, a slot may be selected from the one or more candidate slots. Selection of one candidate slot over other candidates may be preferred depending on criteria including the candidate's state and/or age.

Data may be stored in the cache in connection with performing data operations. For example, when a read request is received from a host computer, a determination may be made as to whether the requested data is in the cache. If so, the data is returned. Otherwise, the data may be read from the particular data storage device, stored in the cache, and then sent to the requesting host. From the cache, a slot is selected in which to store the data. When a write operation is performed, an embodiment may store the data in the cache as a pending write which is actually written to disk at some later point in time in accordance with system specific policies. When the data is written to disk, a cache slot may be added to the pool of slot candidates.

The techniques described herein for obtaining cache slots may be performed in an embodiment in connection with cache management operations, for example, such as those just described for read and write operations.

What will now be described are techniques that may be utilized in connection with dynamic cache partitioning. Cache partitioning may be performed in accordance with one or more criteria used in connection with cache management. The techniques described herein for dynamic cache partitioning affect the amount of cache allocated for use with each family and are used in connection with selection of slot from available cache slot candidates. As described herein, each I/O operation received by a data storage system may be associated with a family. Each family may represent a category or class of I/O operations having a corresponding set of one or more criteria used in connection with cache management. The one or more criteria for each family may be used in connection with obtaining a cache slot for an I/O request associated with the particular family. Additionally, the criteria may be used in connection with determining which cache slot candidate's data is displaced from the cache when a new cache slot is needed.

It should be noted that a family may correspond to a category or class of elements. For example, a family may be associated with I/O requests for one or more logical devices, one or more databases, one or more types of applications that may be executed on a host performing I/O operations, and the like. If, for example, a family is associated with one or more devices, a received I/O operation destined for these one or more devices is processed in accordance with criteria associated with that family. The criteria associated with a family are utilized in connection with the number of cache slots used with I/O requests of the particular family as described in more detail in following paragraphs.

The way in which a particular family designation associated with a received I/O request is known within a data storage system may vary with each embodiment. In one embodiment, the particular families and associated data operations may be implicitly known by the code executing in the data storage system, may be defined in accordance with tables or other data structures included in the originating host and/or data storage system receiving the data operations, and/or communicated in the request for the data operation. For example, the data storage system may know, through the use of tables or other mechanism known to those skilled in the art, that data operations associated with certain devices, from particular applications, and the like, are included in certain families. The data storage system may determine that an I/O operation is associated with a particular family depending on the device, logical or physical, associated with the request for the I/O operation. A particular family designation may also be included in each request explicitly rather than via a designation associated with, for example, the device associated with the request received by the data storage system.

In one embodiment, the criteria associated with one or more families may be determined by a host originating I/O requests to utilize host-side optimization processing and control.

Figure 9:
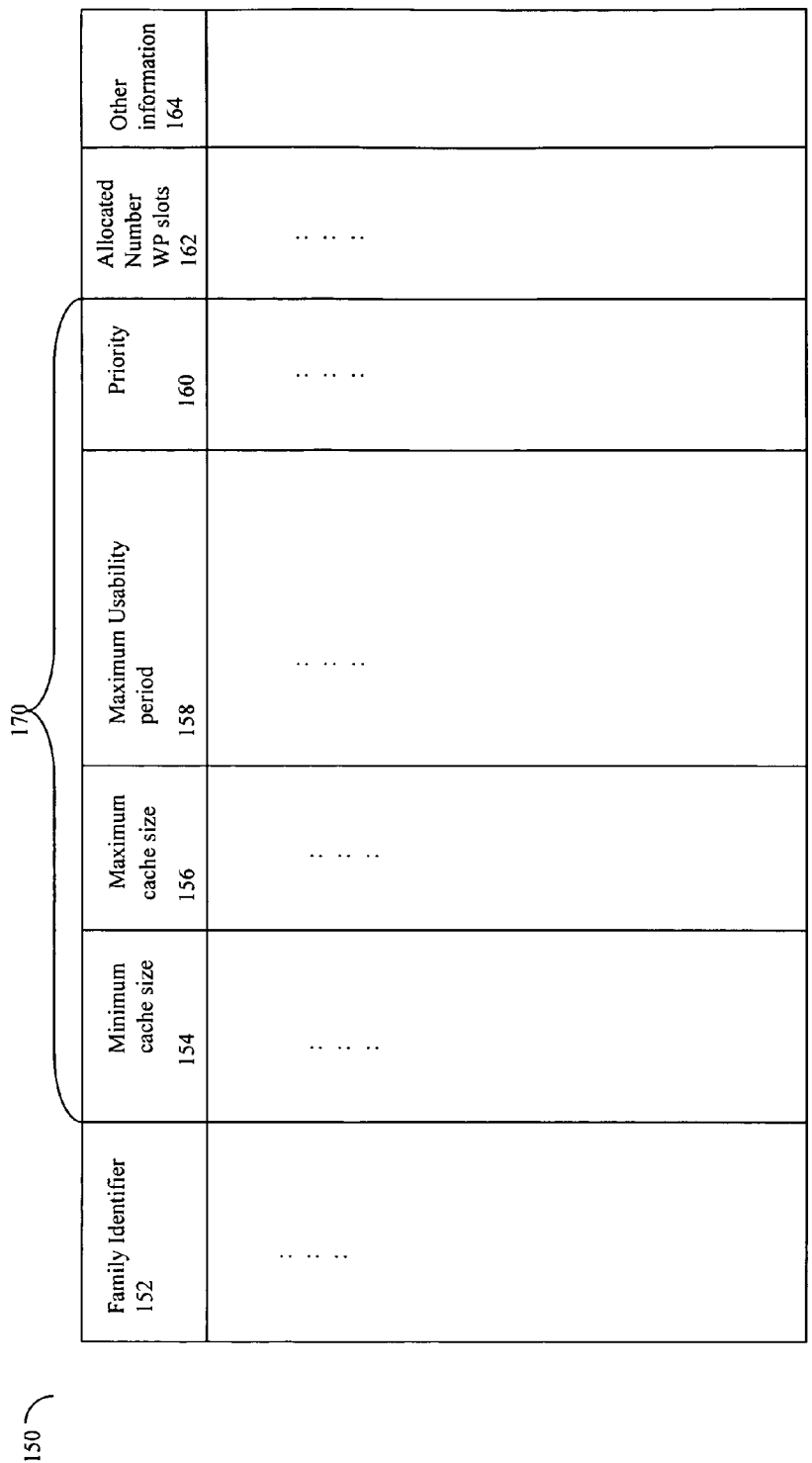
FIG. 9 is an example of an embodiment of a table that may be used in connection with performing the techniques described herein.

Referring now to FIG. 9, shown is an example of an embodiment of a table that may be used in connection with performing the techniques described herein. The table 150 includes criteria that may be associated with each family. In this example, the table 150 is organized into rows of information, each row including information associated with a particular family. Each family is identified by a family identifier 152. Associated with a family identifier 152 are the family's criteria 170. It should be noted that in an embodiment, the family identifier 152 may not actually be allocated as a data item of the table 150. In one embodiment, the family identifier may be the actual index or record number identifying the family's criteria in the table. The criteria 170 associated with each family in this example includes four parameters: a minimum cache size 154, a maximum cache size 156, a maximum usability period parameter 158, and a priority 160. The minimum cache size 154 may represent the minimum amount or partition of cache to be allocated for use in connection with this family. The minimum cache size may be expressed as a percentage value. It should be noted that the minimum cache size may be specified as zero (0) so that no minimum cache size is maintained for the associated family. The maximum cache size 156 may represent the maximum amount or partition of cache to be allocated for use in connection with this family. The maximum cache size may be expressed as a percentage value. In one embodiment, when utilizing the values of 154 and 156 in connection with processing described herein, the percentages may be used on a per extent basis. The values of 154 and 156 may be used in connection with regulating an amount of cache slots allocated for use with this family. As will be appreciated by those skilled in the art, it should be noted that the sum of the minimum percentage values of 154 for all families should not be greater than 100%. Further, those of ordinary skill in the art will appreciate that the size designation of 154 and 156 may be specified in other ways than as percentages, for example, such as an integer value indicating a number of cache slots.

It should be noted that an embodiment may perform checking to ensure that the sum of all minimum cache sizes 154 for all families does not exceed 100%. In particular, for example, an embodiment may allow a minimum cache size of 0 for a family only if the sum does not exceed 100% otherwise it may not be possible to obtain an available slot for the family when needed.

The maximum usability period parameter 158 may be used in connection with determining whether one or more cache slots of the associated family can be donated or given up for use with cache slots requests for other I/O operations associated with the same and/or different families. The parameter 158 may specify an amount of time that a particular slot's data of the particular family is allowed to remain in cache prior to being considered as a candidate for reuse in connection with other requests. In other words, for those slots which contain non-volatile and valid data (e.g., the third state as described elsewhere herein), once the valid data remains in the cache slot for a specified amount of time as indicated by parameter 158, that cache slot may also be a candidate for use in connection with a cache slot request for a different family. The parameter 158 for each class may be used in determining what slots are considered candidates when a slot is requested for use in connection with other families. As an example, the parameter 158 may represent an amount of time indicating that, if the associated cache slot's data remains in cache longer than this amount of time, then the cache slot may be donated for use as a candidate when a request is made for a cache slot in connection with an I/O request associated with another family. The parameter 158 may specify a time period designating a cache slot maximum usability period for a family as follows: data included in the cache slots associated with this family does not need to remain in cache for any amount of time. Such a value for a parameter 158 may be characterized as a "no-reread" policy, for example, when the associated I/Os for this family are mainly sequential read operations, or other types of operations characterized by no chance or minimal chance for rehitting a particular cache slot's data. Such a value for the parameter 158 associated with a family of cache slots may be relatively small in comparison to values for other families, or may otherwise indicate that cache slots of this family remain in cache a "zero" amount of time before being made available for use in connection with other requests. The priority parameter 160 may be used in connection with prioritizing and selection of slot candidates from different families.

The use of the foregoing parameters, and others values, are described in more detail in illustrative examples in following paragraphs. In one embodiment described herein, the values 170 included in table 150 may be used in connection with selecting a cache slot for use in an extent when there are no cache slots in the first state (e.g., containing invalid or irrelevant data), to select from those cache slot candidates in the third state (e.g., containing valid data which is non-volatile and may be displaced). It should be noted that cache slots in the second state (e.g., containing valid data which is volatile) are not included as candidates as described herein. Candidate cache slots include those in the first and third states as described herein. It should be noted that other embodiments may define different states associated with cache slots than as described herein and may utilize the techniques described herein for selection among available candidates.

It should be noted that if a value for one or more of the parameters is not specified, a default value may be used. An embodiment may allow for specification of a value for the foregoing parameters utilizing one or more techniques as may be included in a particular embodiment. The parameters may be set via a configuration file, system parameters, and the like. An embodiment may allow a user to define, initially or as a redefinition, values for one or more of these parameters associated with one or more families. An embodiment may also provide for automatic determination of one or more of the foregoing parameters. The automatic determination may be made, for example, by executing code which uses historical data, such as usage of cache slots or characteristics of I/O operations included in a particular family over a time period, to tune one or more parameter values. For example, if historical data collected for a particular family indicates that I/O operations are mostly sequential read or other operations not likely to reuse cached data, executing code may analyze this historical data and automatically adjust the maximum usability period parameter for this particular family. Over time, if the I/O operations observed change to include more operations likely to reuse cached data, the maximum usability period parameter for this particular family may be accordingly readjusted.

Also associated with each family represented in the table 150 is an allocated number of WP (write pending) slots 162. The value included in 162 for a family represents the number of cache slots currently containing WP data. As will become apparent to those skilled in the art in connection with processing steps described herein, the number of WP cache slots currently allocated may be used in connection with cache management techniques. Column 164 may also represent one or more other pieces of information stored for each family.

In one embodiment, the parameters 170 associated with each family may be stored in GM of the data storage system with a local copy utilized by each director (e.g., Disk adapter (DA), Fibre channel adapter (FA), and the like). The value of 162 for each family may be stored in GM and updated with each WP cache slot allocated by a director. As will be appreciated by those skilled in the art, when referencing any shared data item such as those that may be stored in GM, an embodiment may use any one of a variety of different synchronization techniques to control and regulate access to the shared data item.

Figure 10:
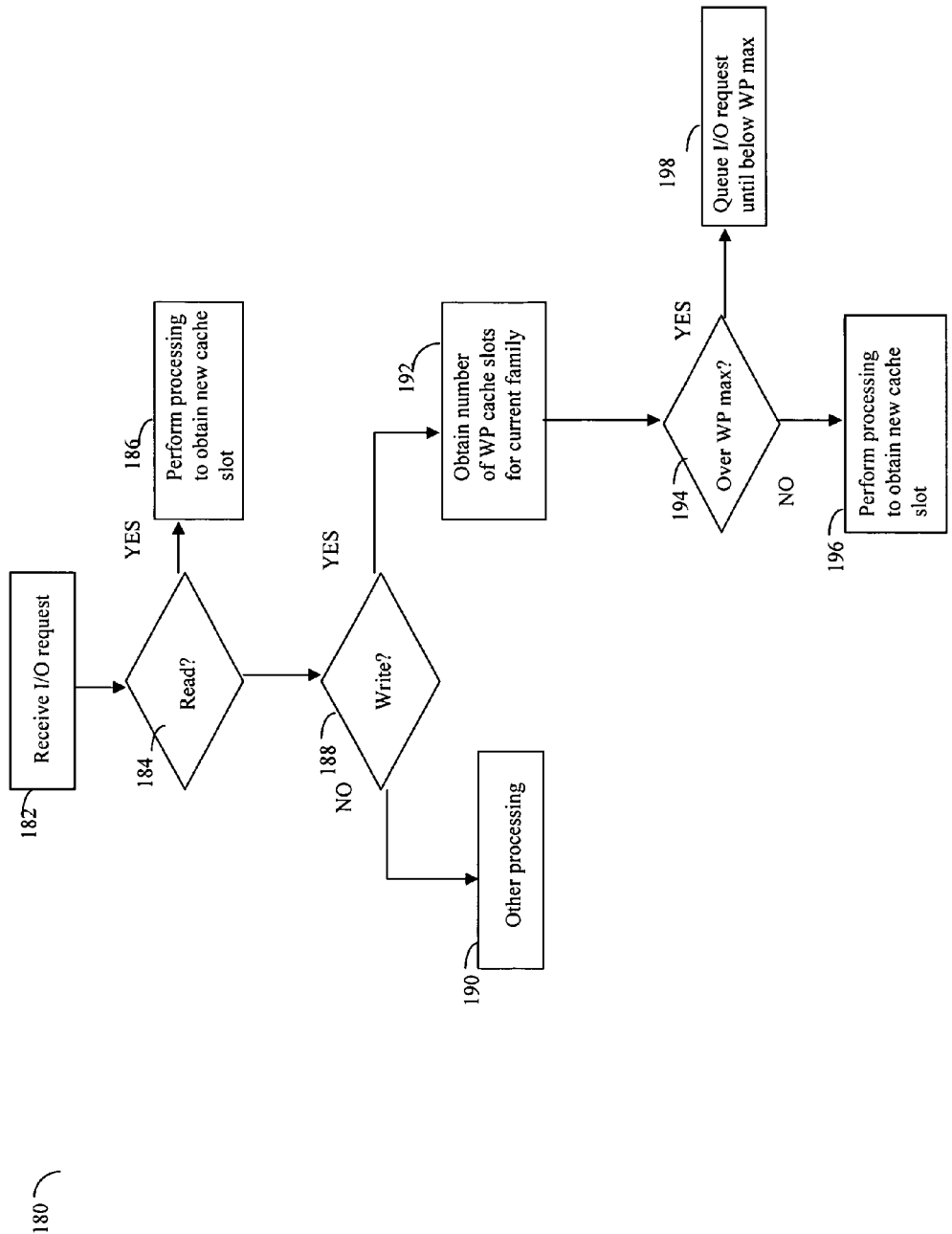
FIG. 10 is a flowchart of processing steps that may be performed in an embodiment in connection with receiving an I/O request and obtaining a cache slot for use in connection with the received I/O request.

Referring now to FIG. 10, shown is a flowchart of processing steps that may be performed in an embodiment in connection with receiving an I/O request and obtaining a cache slot for use in connection with the received I/O request. The steps of flowchart 180 utilize the value 162 in connection with determining whether to currently allocate a cache slot for a new data operation in order not to have too many write pending operations allocated cache slots. If the number of cache slots associated with WP operations exceeds some amount as indicated by 162 for a particular family, no cache slot is allocated at the current time for a received data operation. Rather, an embodiment as described utilizing flowchart 180 may queue the I/O request and allocate a cache slot at a later time when the number of cache slots associated with WP operations for this family have fallen below some threshold value. In other words, once cache slots of this family associated with WP operations have the corresponding data written out to the devices, the number of cache slots associated with WP operations decreases. At a later time, such as, for example, when the number of cache slots associated with WP operations for this family is below a threshold, one or more pending WP operations for this family as included in the queue may be processed.

It should be noted that as described herein, the processing described herein for obtaining a cache slot may be performed by any one or more processors included in a director, such as a DA, RA, FA (fibre channel adapter), and the like, to obtain a cache slot from GM.

At step 182, an I/O request is received at the data storage system. At step 184, the director processing the I/O request determines if the data operation is a read operations. If so, control proceeds to step 18 to perform processing to obtain a new cache slot. Otherwise, control proceeds to step 188 where a determination is made as to whether the data operation is a write operation. If not, control proceeds to step 190 to perform other processing. If step 188 determines that the received I/O request is for a write operation, control proceeds to step 192 to obtain the current number of WP cache slots for the family associated with the I/O operation. The value obtained at step 192 may be the value included in 162 of the table of FIG. 9 for this particular family. At step 194, a determination is made as to whether the number of WP cache slots for this family is over a specified threshold. The particular threshold is associated with the number of WP operations that are allowed to have allocated cache slots. In one embodiment, this threshold value may be determined as 80% of the minimum cache size for this family. It should be noted that this threshold, WP max, used in step 194 may be determined as a percentage of all WP cache slots across multiple extents. Accordingly, the value included in 162 as may be stored in GM may be updated each time a cache slot is allocated for use with a write operation (WP) for each extent. If step 194 determines that the number of cache slots currently allocated for use with WP operations (e.g., write operations having data in cache slots not yet written out to the device—second state as described above) is above the threshold WP max, control proceeds to step 198 where the current write operations as received at step 182 is placed on a queue or other structure to await processing at a later time when the number of cache slots for this family is below the WP max threshold. If step 194 evaluates to NO, control proceeds to step 196 with processing to obtain a cache slot for the request received at step 182. It should be noted that if step 196 results in successfully obtaining a new cache slot for the write request, the number of WP slots as indicated in the table 150 for the current family is incremented. Similarly, as the WP cache slot's data is written out to disk, the number of allocation WP cache slots is accordingly decremented. It should be noted that although not explicitly mentioned in connection with all processing steps as described herein, it will be appreciated by those of ordinary skill in the art that values, counters, and the like, used in connection with the techniques described herein may be implicitly incremented and/or decremented in accordance with the processing steps.

It should be noted that the processing of steps 186 and 196 to obtain a cache slot will now be described. This description will be illustrated utilizing an embodiment having one or more extents using the tag-based cache structure, for example, of FIG. 5. However, as will be appreciated by those of ordinary skill in the art, other cache structures may be used in connection with the techniques described herein.

Figure 11:
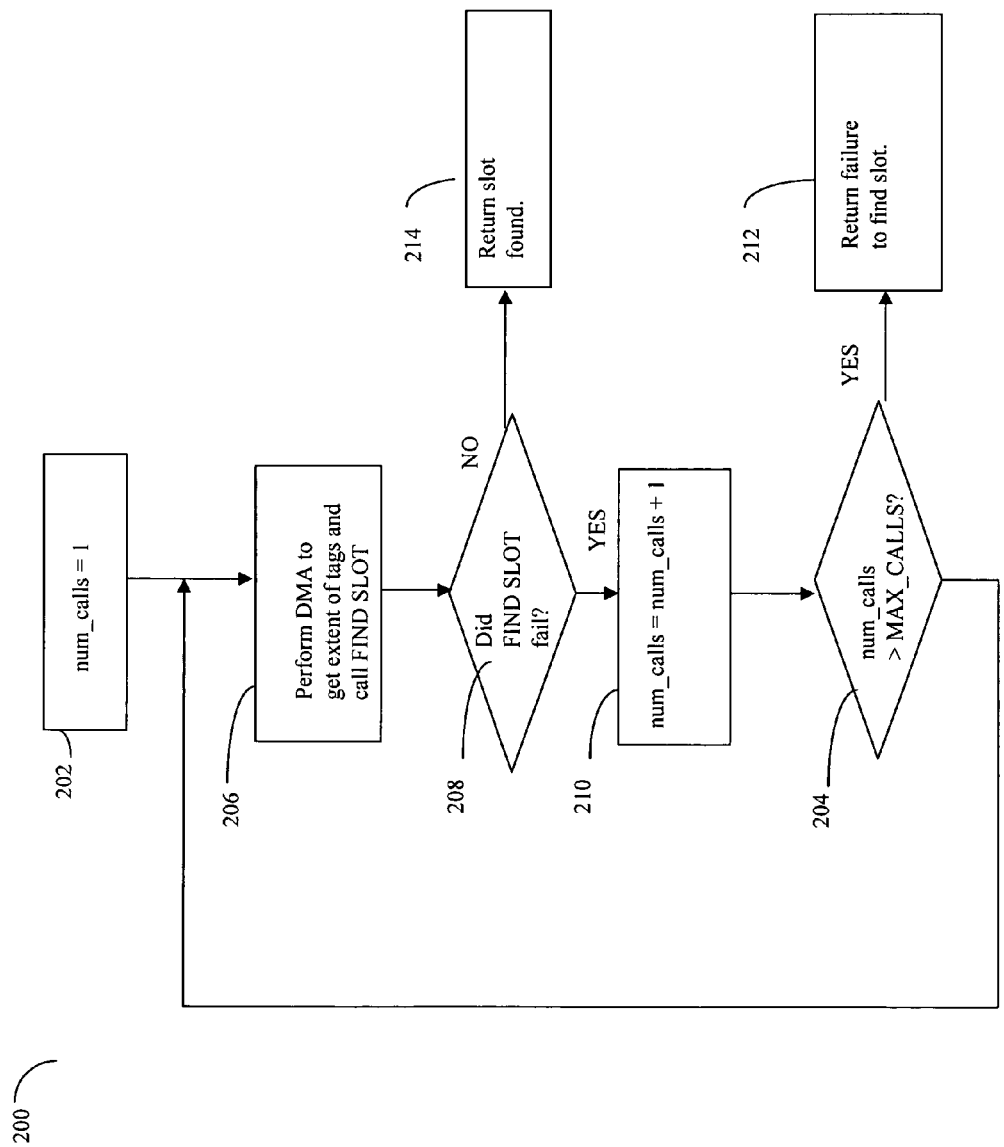
FIG. 11 is a flowchart of processing steps that may be performed in an embodiment in connection with selecting a cache slot.
Figure 12:
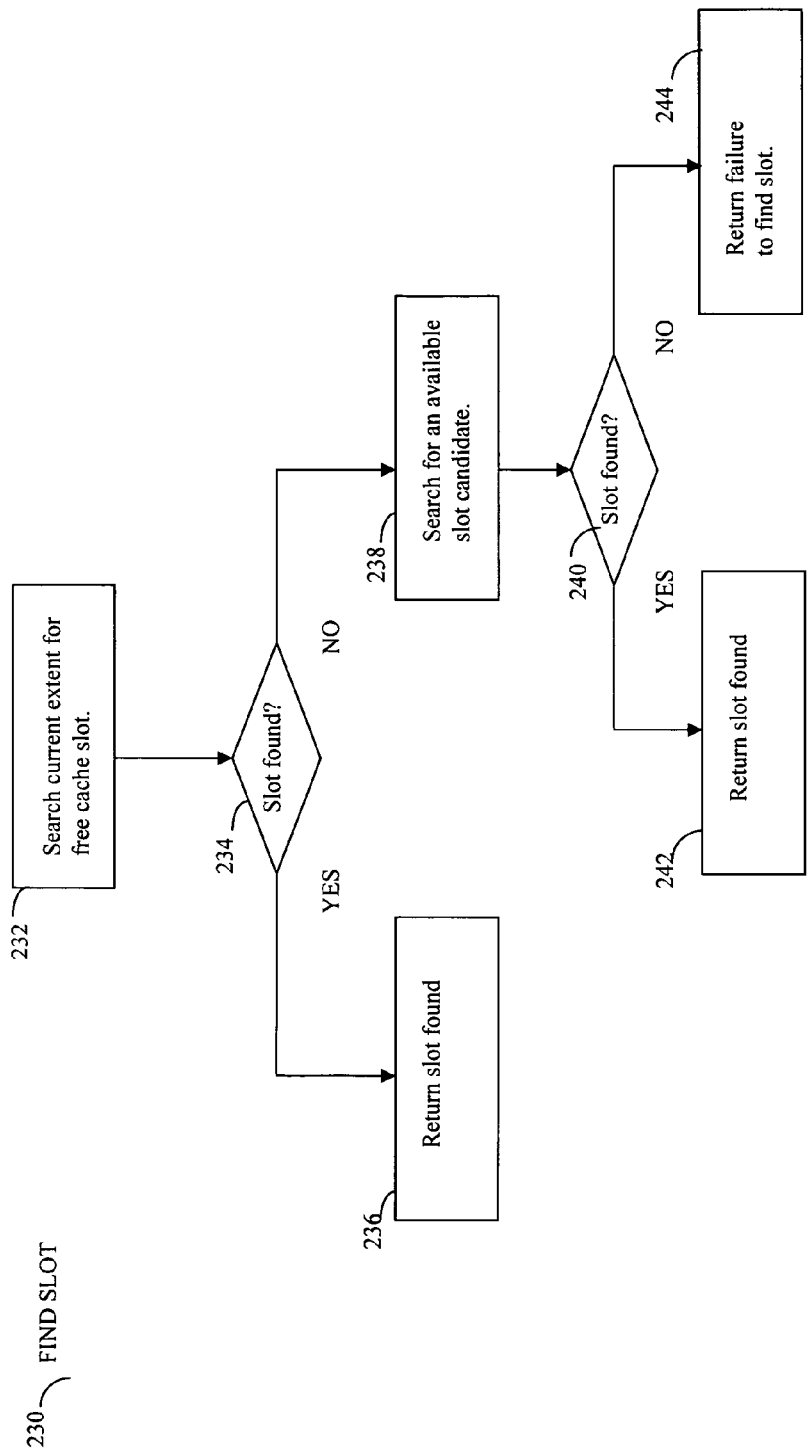
FIG. 12 is a flowchart of processing steps that may be performed in an embodiment of the FIND SLOT routine.

Referring now to FIG. 11, shown is a flowchart of processing steps that may be performed in an embodiment in connection with selecting a cache slot. Described in following text in connection with FIG. 12 is a flowchart 230 that sets forth processing that may be performed in connection with steps 186 and 196 of FIG. 10. The steps of may be performed by each DA, RA, FA, or other processor, for example, within a system such as described in connection with FIG. 2A as may utilize the cache of the data storage system.

In FIG. 11, at step 202, a variable num_calls is initialized to 1. Num_calls tracks the number of times FIND SLOT is called and causes determination of a failure condition after a predetermined number of calls to FIND SLOT does not return a cache slot. Control proceeds to step 206 where an extent of tags is read from global memory and a local copy is made. Additionally in step 206, the routine FIND SLOT is called, which is described in more detail in following paragraphs. FIND SLOT attempts to locate and return a cache slot for use.

It should be noted that in connection with step 206, a new extent or portion of tags may be obtained with each invocation of step 206. Thus, each time each processor attempts to find a slot within an extent of tags, a new extent of tags is obtained. An embodiment may use any one or more different techniques in connection with selection of an extent of tags to be used at step 206.

Control proceeds to step 208 where a determination is made if FIND SLOT succeeded or failed in locating a cache slot for use. If a slot is found, control proceeds to step 214 where the determined slot is returned. Otherwise, if FIND SLOT failed, control proceeds to step 210 where num_calls is incremented by 1. Control proceeds to step 204 where processing then continues.

At step 204, a determination is made as to whether the number of calls (as represented by num_calls) exceeds a predetermined maximum, MAX_CALLS. If so, control proceeds to step 212 where a failure is returned. Otherwise, control proceeds to step 206. It should be noted that MAX_CALLS may be a predetermined value that may vary in accordance with each embodiment. For example, in one embodiment, MAX_CALLS is 100.

Referring now to FIG. 12, shown is a flowchart of processing steps that may be performed in an embodiment of the FIND SLOT routine. Flowchart 230 processing may be performed utilizing the extent of tags as determined at step 206. At step 232, the current extent of tags is searched to determine if there is a free cache slot. A free cache slot may be characterized as a cache slot that does not include valid data and is in the first state as described elsewhere herein. The foregoing state of the cache slot may be determined in accordance with the particular values of each slot's associated tag. The first slot detected which is in this first state may be selected. At step 234, a determination is made as to whether a free slot has been determined. If so, control proceeds to step 236 where the free slot selected is returned for use. Otherwise, if step 234 evaluates to NO, control proceeds to step 238 to search the current extent for an available slot candidate from any slots in the current extent which may be in the third state as described elsewhere herein. As described herein, step 238 may search the extent to determine if any slot in the extent includes valid data which is not in a volatile state. In other words, step 238 processing attempts to determine if there is a slot that includes valid data but may be displaced from the cache. An embodiment may use any one or more different techniques in connection with selecting such a slot from one or more slots that include valid data. Examples of such techniques that may be included in an embodiment are described elsewhere herein. Additionally, more detailed processing associated with one embodiment of the FIND SLOT routine is described in more detail herein. At step 240, a determination is made as to whether a cache slot candidate has been found. If so, control proceeds to step 242 to return the selected slot for use. Otherwise, control proceeds to step 244 where a return status indicates a failure to find a slot in the current extent.

Figure 13:
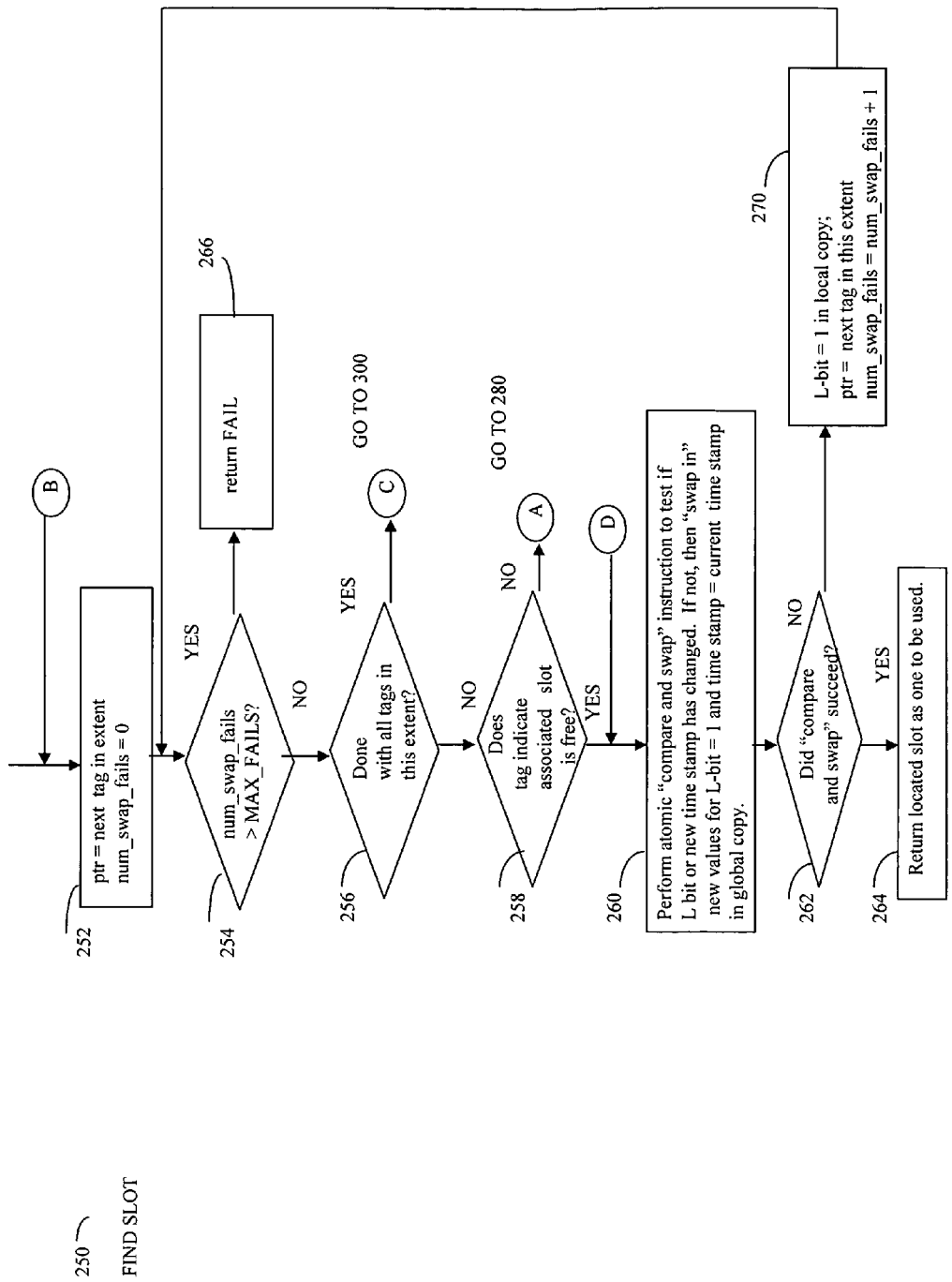
FIGS. 13-15 are flowcharts setting forth more detailed processing steps that may be performed in an embodiment of the FIND SLOT routine.
Figure 14:
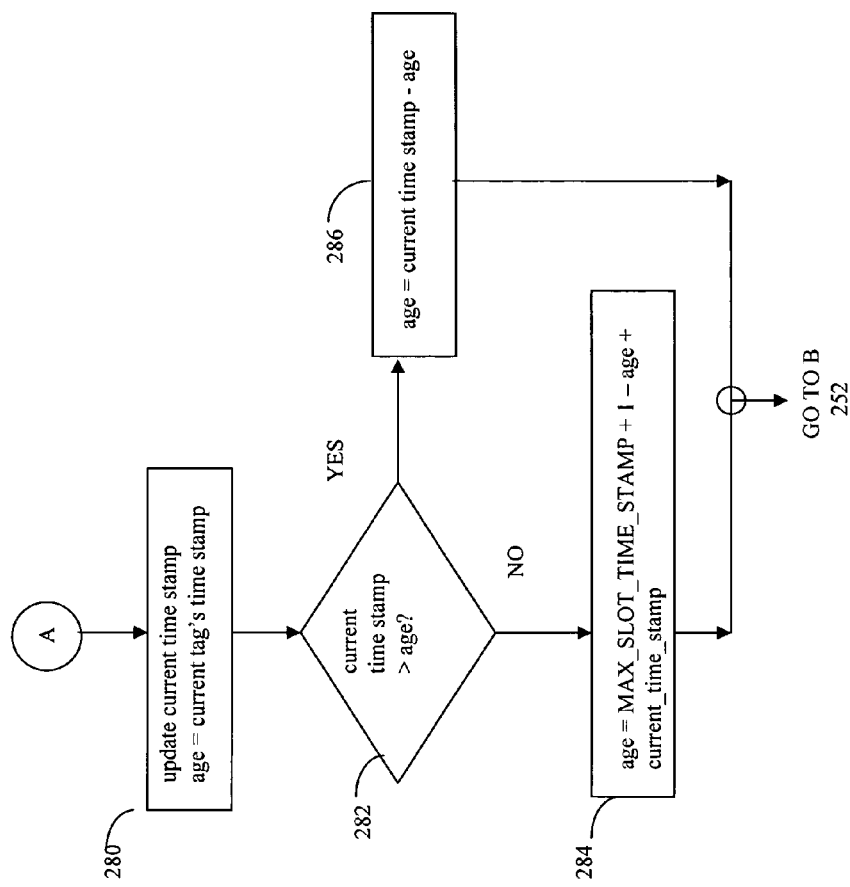
Figure 15:
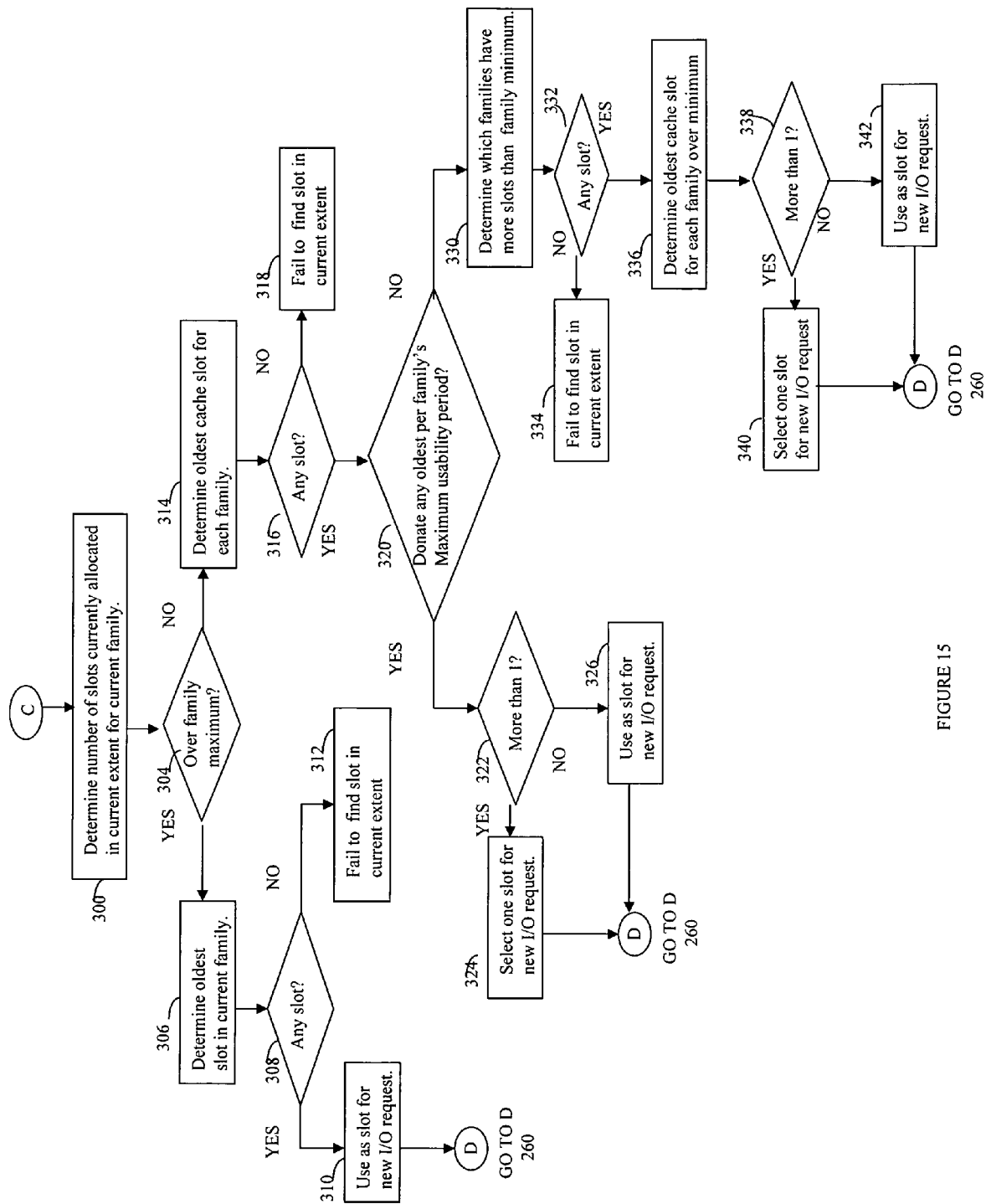

Referring now to FIGS. 13-15, shown are flowcharts that set forth more detailed processing steps of an embodiment of the FIND SLOT routine. These figures set forth more detailed processing steps of the flowchart 230 of FIG. 12.

Referring now to FIG. 13, shown is a flowchart 250 of processing steps performed in an embodiment of the FIND SLOT routine. At step 252, ptr is assigned to point to the next tag in the current extent of tags. Initially, this is the first tag in the current extent. Additionally, the num_swap_fails tracking variable is initialized to 0. num_swap_fails counts the number of failed swaps as described in following paragraphs. At step 254, a determination is made as to whether num_swap_fails exceeds a predetermined maximum. In one embodiment, MAX_FAILS may be 4. Other embodiments may have other values for MAX_FAILS that may vary from that described herein. It should be noted that each DA, director or processor may have its own unique ptr such that each DA, for example, may attempt to obtain a slot from locations different than that of other DAs. If a determination is made at step 254 that the maximum number of failed swap attempts has been exceeded, control proceeds to step 266 where failure is returned. Otherwise, control proceeds to step 256.

At step 256, a determination is made as to whether processing is complete for all tags in this extent. In other words, if step 256 evaluates to YES, traversal of the tags for the current extent has resulted in a finding of no free slots. If so, control proceeds to step 300 in FIG. 15 where a determination is made as to whether there is an available slot candidate that includes valid data but may be displaced from the cache. The processing steps of FIG. 15 are described in following paragraphs to select from any available cache slot candidates (e.g., in the third state) in accordance with other criteria as may be included in an embodiment of the table of FIG. 9.

If, at step 256, a determination is made that all tags in this extent have not been examined to determine if any cache slots are free, in accordance with the local copy, control proceeds to step 258 where a determination is made as to whether the current slot identified by the current tag is free as indicated by the tag as being in the first state described herein. In accordance with the embodiment described herein, this may be determined using the time stamp where a particular value may be placed in each time stamp field when a corresponding slot is returned to the pool of free slots. Any particular value may be used in an embodiment, such as a time stamp of 0, which may vary in accordance with each embodiment. If it is determined that the current slot is free, control proceeds to step 260 where an atomic operation may be performed. In one embodiment, this may be performed using an atomic "compare and swap" instruction which tests the L-bit and time stamp of the current tag to see if the values of either have changed since the determination at step 258. If the values have not changed, then the instruction also "swaps in" or updates values of the L-bit and time stamp fields by setting the L-bit to 1 and setting the time stamp to be that of the current time. It should be noted that this update of the current tag is performed to the copy in global memory. Additionally, the processing performed at step 260 is also performed using the copy from global memory.

Performing the compare and swap as an atomic, uninterrupted operation may be used to guarantee exclusive access to the shared resource of the cache or shared memory since, for example, multiple DAs may be attempting to access the same portion of shared memory, such as the same cache slot. The determination at step 258 may be performed, for example, by two different DAs reaching the same conclusion that a particular slot is free. However, only one of the DAs may actually be granted or obtain the slot since the atomic compare and swap operation may only be performed by one DA at a time in an uninterrupted fashion. The second DA's compare and swap will result in failure in that the values were changed by the first DA's successful execution of the compare and swap instruction.

The processing performed in connection with step 260 may be performed atomically using other instructions and/or techniques known to one of ordinary skill in the art, for example, in connection with accessing a shared resource such as the shared memory or cache as described herein. One example of the atomic performance or processing steps is the atomic "compare and swap" instruction which may be implemented in hardware and/or software. Another embodiment may utilize other techniques in performing an equivalent of this atomic operation by performing the following pseudo-code steps:

1. lock portion of shared resource
2. if L bit or time stamp has changed
   then FAIL and unlock shared resource
   else /*SUCCESS*/
      swap in new values as in step 260
      unlock shared resource The foregoing may be implemented using different mechanisms and techniques included in a system for providing exclusive access to a shared resource, such as the shared memory used as the cache in this instance.

It should be noted that the granularity used in connection with the lock and unlocking of a resource may vary in accordance with each particular embodiment. For example, in one embodiment, a locking mechanism may be provided which locks a minimum of a word size. Other embodiments may have other limitations. It may be desirable to lock for exclusive access the smallest amount or unit allowable within limits of a particular system which is also the size of a tag or portion thereof being accessed by multiple processors.

At step 262, a determination is made as to whether the compare and swap instruction succeeded. If so, control proceeds to step 264 where the located slot is returned as the one to be used. Otherwise control proceeds to step 270 where the L-bit is set in the local copy so that this slot is not examined again. The next tag is obtained in the current extent and the num_swap_fails is incremented by 1. Control proceeds to step 254.

If a determination is made at step 258 that the cache slot associated with the current tag is not free (e.g., in the first state), control proceeds to step 280 which is continued in FIG. 14. FIG. 14 includes processing steps associated with updating the timestamp associated with a cache slot. As described herein, the timestamp may be used to indicate an age of a cache slot used in connection with determining how long a cache slot's data remains in cache. Other embodiments may use other techniques in connection with relative placement of a current cache slot with respect to other cache slots affecting how long a cache slot's data remains in cache.

At step 280, the current time stamp is updated and the temporary variable age is assigned the current tag's time stamp value. It should be noted that the processing step of updating the current time stamp may be performed in any one of a variety of different increment units. For example, in one embodiment, current time stamp may be updated in increments of 4 units. In this example, multiple processors may be using the same cache in which each of the processors has its own clock and associated time used in connection with time stamps. Each of the processor clocks may have time synchronization differences such that at a particular point in time, time stamps produced by any two of the clocks may differ. A time stamp increment, such as 4 units, may be selected in accordance with any such synchronization differences when comparing or using time stamp values as in processing herein. In one embodiment, the increment is 4 units=2 seconds, each unit being ½ second. This increment amount may vary in accordance with embodiment.

At step 282, a determination is made as to how much time has elapsed since the time indicated by the current slot's time stamp (e.g., as reflected in the age variable). If step 282 evaluates to YES, control proceeds to step 286 where age=current time stamp−age. Otherwise, control proceeds to step 284 where "wrap around" of the time stamp value is taken into account and age may be calculated as MAX_SLOT_TIME_STAMP+1−age+current time stamp. Note that "MAX_SLOT_TIME_STAMP is the maximum value of a time stamp before the value "wraps around" and starts over again at 0. It should be noted that processing associated with step 284 may be more generally represented as: age=(current time stamp+wrap around factor)−age, where the "wrap around factor" varies with the particular values used in an embodiment at which wrap-around occurs. Following steps 286 and 284, control then proceeds to step 252.

The processing at steps 282 and 286 obtain an absolute value of the age of the current slot which is a difference of the amount of time from when the slot was last used subtracted from the current time. The processing of steps 282 and 286 are used in connection with handling time stamp values which "wrap around" for very large values causing the value of the time stamp to overflow. When this point is reached, the age starts over at a new value similar to a counter which, when its maximum is reached, is reset.

As data associated with a slot is moved in and out of cache, the cache index or directory, for example as illustrated in FIG. 5, may accordingly be updated.

It should be noted that in the foregoing embodiment using tags for cache management, a particular slot may be noted as "not available" (e.g. in the second state) having its L-bit set (=1) in a global copy. A cache slot which is "not available" may be characterized as one in the second state described elsewhere herein which includes volatile data and should not be removed from the cache such as, for example, data associated with a pending write operation which has not yet been written out to the disk. Use of the L-bit as a technique for indicating when a slot is not available may be used to manage a shared cache, for example, rather than using a cache implementation with linked lists and pointers as described elsewhere herein. Similarly, a slot may be indicated as "available" (e.g., in one of the first state or third state described herein) by clearing (=0) the L-bit. The associated time stamp may be set to any one of different values affecting when a particular slot may be selected for use. For example, the time stamp may be set to a value of 0 indicating that the data in the cache slot is invalid (e.g., the first state). Such cache slots which are available (e.g., L-bit=0) and including invalid data (e.g., time stamp=0) may be characterized as "free", the first state, as described elsewhere herein. Such slots which are free may be selected for use prior to utilizing cache slots which are available and include valid data (e.g., the third state as may be indicated with a non-zero time stamp).

Adjusting the time stamp to different times may be used when indicating a cache slot is available for use, such as, for example, when setting the L-bit to 0. For those cache slots including valid data, the time stamp may be set to a particular value to indicate an age of a slot affecting how long the associated data for the slot remains in cache. As described elsewhere herein, clearing the L-bit and resetting the time stamp to 0 in a global memory copy of a tag may be used to indicate that this slot is "free" including invalid data and should be selected prior to other available cache slots having non-zero time stamps. A time stamp of zero in this instance may be used to indicate that the cache slot contains meaningless or invalid data. A non-zero time stamp may affect when a particular cache slot is selected based on age, for example, since the "oldest" cache slot may be selected from all cache slots having non-zero time stamps. It should be noted that in a cache slot with an L-bit=0, a non-zero time stamp may be used to indicate that although the slot is "available", the slot does contain valid data that may also be used, for example, in connection with a write pending data portion that has been written out to disk and subsequently for some time the data still remains in the cache. Accordingly adjusting the time stamp may cause the age determination of the associated slot to vary. This technique may be used in connection with causing data in particular slots to remain in the cache for longer or shorter periods of time. This time stamp adjustment may be used, for example, as an alternative to physically inserting a slot at different points in a cache data structure, for example, such as in adjusting pointers in a linked list. Depending on techniques and policies that may be included in each embodiment, it may be desirable to have slots of data having particular characteristics remain in cache longer than other slots having other characteristics.

In particular, an embodiment may adjust the time stamp value of an associated slot in accordance with the Fall Through Time (FTT). Generally, the FTT refers to the average amount of time it takes for an unpromoted slot once it is in the queue to exit the queue. In other words, it is the average amount of time it takes a slot to pass through or "fall" through the queue from the head position and then exit out of the queue through the tail position, for example, referencing the illustration of FIG. 4. A slot may be added to the head position or at another position in accordance with the relative time stamps of those in the queue. The FTT is described in issued U.S. Pat. No. 5,592,432, Vishlitzky et al, which is incorporated herein by reference.

The FTT may be calculated for each slot by taking a first time stamp at the position when an element is lastly placed at the head of the replacement queue, and then taking a second time stamp value when that same slot exits the replacement queue (such as when a slot exits or leaves at the tail). The difference between the second ending time stamp value and the starting or first time stamp value for each particular slot may be used in calculating an average amount of time. It is this average amount of time that represents the FTT for a large number of slots.

The use of the FTT is just one way to indicate the age of a slot. What will now be described are processing steps using the age of a cache slot in conjunction with other parameters included in the table of FIG. 9 in connection with selection of a cache slot for use when step 256 evaluates to YES to select from cache slot candidates in the third state as described herein.

Referring now to FIG. 15, processing steps of an embodiment are described for selection of a cache slot candidate from those in the third state as described herein. The processing of FIG. 15 is performed for a single current extent. It should be noted that certain values used in processing steps of FIG. 15 may be determined for each extent as read with each DMA access, for example, as at step 206. In one embodiment, prior to performing processing steps of FIGS. 12-15 in connection with FIND SLOT, the current extent may be processed to determine values for criteria used in determining a best cache slot candidate. This criteria may include, for example:

1) the number of cache slots of the current extent that belong to each family;

2) for each family, the oldest cache slot candidate of all cache slots which are in the current extent and in the third state; and 3) the number of cache slots currently allocated in the current extent for the family of the received data operation.

As the extent is processed by the current director, the foregoing values may be used by the director in processing. In one embodiment, the foregoing values may be determined each time a new extent is obtained and used while the current extent is being processed by the director, for example, in connection with processing of the FIND SLOT routine of FIGS. 12-15. Once the director is done processing the current extent, these values may no longer be maintained by the director. In the embodiment using the tag-based cache arrangement with extents as described herein, the size of each extent's tag data is relatively small to process as each new extent is obtained by each director. Thus, the foregoing values may be determined each time an extent is obtained by each director and utilized while that extent is being processed by that director. By partitioning each extent on a per family basis in accordance with the parameters described, for example, in connection with FIG. 9, the entire cache may be partitioned as a whole. For example, if two families each have a 50% minimum cache size, each of the extents may also accordingly be partitioned using the techniques described herein.

It should also be noted that an embodiment may alternatively choose to determine one or more of the values when referenced or used in processing steps rather than collectively determine all the values when each extent is initially read. As will be appreciated by those of ordinary skill in the art, an embodiment may also perform one or more other optimizations. For example, an embodiment may prefetch one or more extents for use by a director and determine the foregoing values for the extent used in FIND SLOT processing when the extent is read.

In connection with those data items for an extent stored in GM, for example, as described in connection with FIG. 9, an embodiment may store a local copy of the data items and update the local copy in connection with processing steps as described herein. The copy of the data items in GM may be updated in accordance with the local copy by a director at predetermined time intervals in order to reduce the number of GM accesses At step 300, the number of slots currently allocated for the current extent for the family of the received data operation is determined. This value may be stored locally at a director currently processing the current extent. At step 304, a determination is made as to whether the number of cache slots currently allocated for the current family exceeds the family maximum. The family maximum in one embodiment may be determined by obtaining the maximum cache size parameter 156 for the current family from the table as illustrated in FIG. 9. If the value of 156 is a percentage and the total number of slots currently allocated for the family is based on a single extent, a determination can be made as to whether the current number of slots allocated exceeds the percentage of parameter value 156 multiplied by the number of cache slots in a single extent. If the total number of cache slots for the family is based on all cache slots, the parameter value 156 represents a percentage of all cache slots rather than the number of cache slots in a single extent.

If step 304 determines that cache slot allocation for the current family is over the maximum, control proceeds to step 306 to determine the oldest slot in the current family of all cache slot candidates in the third state as described herein. At step 308, a determination is made as to whether any slot is in this third state, as may be determined in accordance with the L-bit and time stamp values. It should be noted that an embodiment may store an identifier indicating the age and the associated cache slot for the oldest available cache slot (e.g., in the third state) in each family. This may be performed in connection with other processing, for example, as described in connection with FIG. 14.

If no slots in the current extent are in the third state, control proceeds to step 312 where a status is returned indicating that processing failed to find a cache slot in the current extent. If step 308 evaluates to YES, control proceeds to step 310 to return the oldest available cache slot for use in connection with the current request. Control then proceeds to step 260.

If step 304 determines that slot allocations are not over the family maximum, control proceeds to step 314 to determine the oldest cache slot in each family. In one embodiment, this may be determined by comparing the age values retained as the oldest for each family. A determination is made at step 316 as to whether there is any cache slot for any family in the third state. If not, control proceeds to step 318 where a status is returned indicating a failure to find a cache slot for use in the current extent. If step 316 evaluates to YES, control proceeds to step 320. At step 320, a determination is made for each family having an oldest cache slot in the third state, whether the oldest cache slot is a candidate in accordance with each family's maximum usability period parameter 158. As described elsewhere herein, the parameter 158 may indicate a threshold time value specified for a cache slot of a family that the data of the cache slot is to remain in the cache even though the cache slot is in the third state and is the oldest in the family. A determination is made at step 322 as to whether there is more than one cache slot candidate by further examining the maximum usability period parameters 158 for each family. If step 322 determines that there is only one such cache slot, control proceeds to step 326 where this slot is returned as available for use. Otherwise, if step 322 determines that there is more than one cache slot available in accordance with the maximum usability period parameters of each family, control proceeds to step 324 to select one of the multiple cache slots. Any one of a variety of different techniques and selection criteria may be used in an embodiment in step 324 processing. For example, the cache slot selected at step 324 may be the oldest of all cache slots, a randomly selected one of the oldest cache slots determined as available in accordance with family values for 158, or a cache slot selected in accordance with the priority parameter 160. The parameter 160 may designate a relative priority of each family and may be used to select one of the cache slots at step 324 processing. Control then proceeds to step 260.

If step 320 evaluates to NO, control proceeds to step 330 where it is determined whether any families have more slots than the designated family minimum. The family minimum may be specified as a percentage value and indicated by the minimum cache size 154 as included in the table of FIG. 9. The number of minimum slots may be similarly determined by multiplying the minimum percentage of 154 by a total number of cache slots, such as the total number of cache slots in an extent. At step 332, a determination is made as to whether any family is over its designated family minimum threshold. If not, control proceeds to 334 where a return status indicates a failure to find a cache slot in the current extent. Otherwise, if step 332 determines that there is at least one family with more than a designated family minimum number of slots, control proceeds to step 336 where the oldest cache slot for each such family over its minimum is determined. At step 338, a determination is made as to whether there is more than one such slot as a result of step 336 processing. If not and only a single slot is determined, control proceeds to step 342 to return this single slot as the one selected for use with the current request. Control proceeds to step 260. If step 338 determines that there is more than one cache slot, control proceeds to step 340 to select one of these cache slots for use with the current request. As described in connection with step 324 processing, an embodiment may use any one or more techniques to select one slot when there are multiple slots available in accordance with the conditional processing performed leading to step 340. An embodiment in step 340 processing may use one of the techniques as described herein in connection with step 324 processing. Control then proceeds to step 260.

It should be noted that with reference to FIG. 15, when control proceeds to step 260, an attempt is made to perform the "compare and swap" processing using the best candidate determined in accordance with the processing of FIG. 15. If the "compare and swap" processing for the current best candidate fails, processing may continue in an embodiment by first removing the current best candidate from the list of possible candidates (e.g., step 270 setting the L-bit to 1 in the local copy to avoid considering again as a candidate). Processing of FIG. 15 may again be performed to determine any next best cache slot candidates (e.g., subsequent transfer to 300 of FIG. 15 from step 256 of FIG. 13).

It should be noted that in connection with steps 320 and 330 in the embodiment described herein in FIG. 15, the maximum usability period for a family may be characterized in one aspect as overriding the minimum cache size for that particular family.

What will now be described is a high-level description of another embodiment of a FIND SLOT routine.

Figure 16:
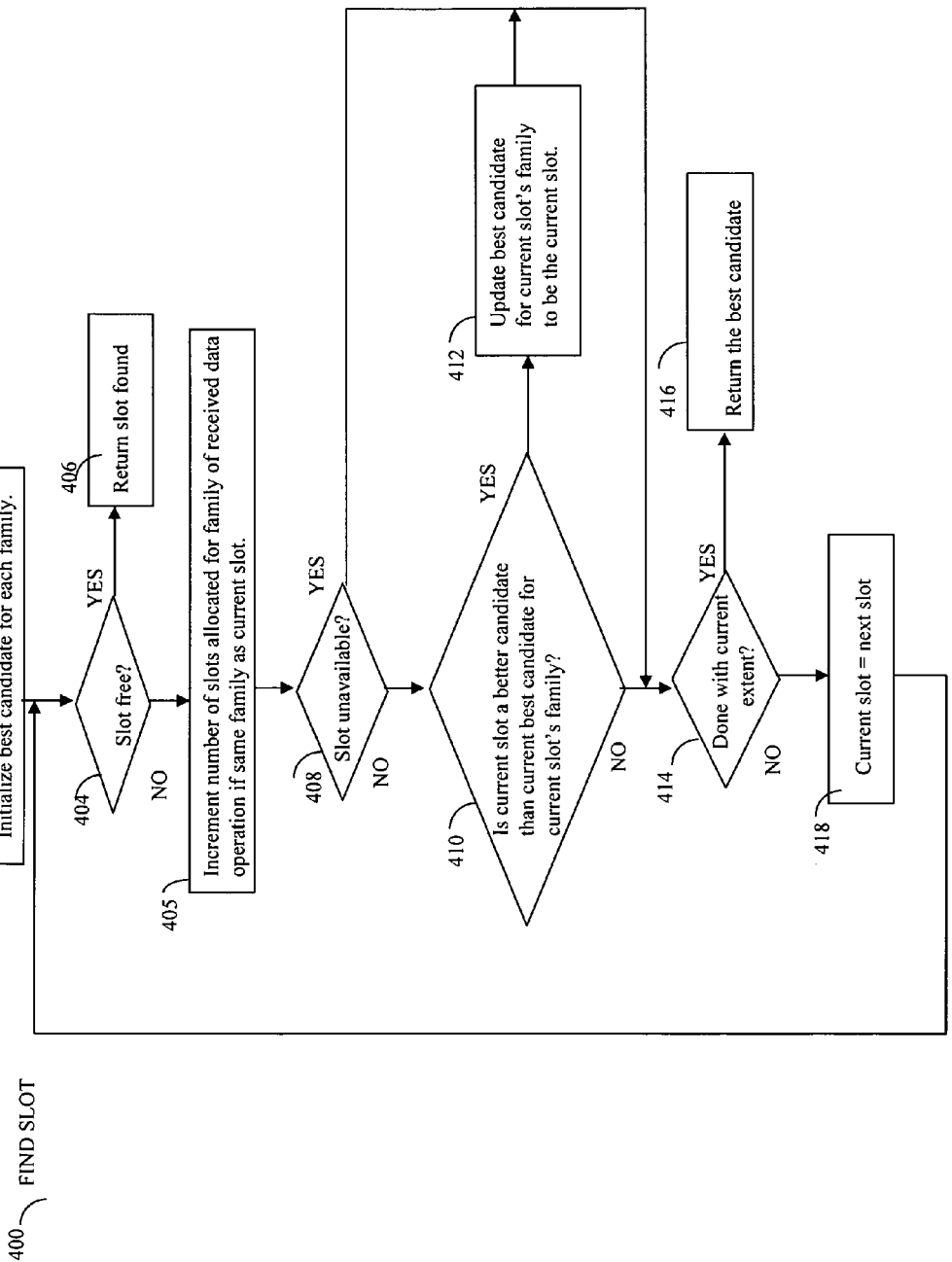
FIG. 16 is a flowchart of processing steps of another embodiment of the FIND SLOT routine.

Referring now to FIG. 16, shown is a flowchart 400 of processing steps of another embodiment of the FIND SLOT routine. It should be noted that the processing steps of FIG. 16 may be performed as an alternative to the processing steps described in connection with FIG. 12. The processing steps described in connection with FIG. 12 perform a search for a cache slot candidate by first searching the current extent of slots to determine if there are any free cache slots. Subsequently, if there are no free cache slots, a best available cache slot may then be determined using one of several different techniques. An embodiment may then perform a second iteration over all of the cache slots to determine those cache slots which are available. From those available cache slots in the third state, as described herein, and embodiment may select a best candidate, for example, using the processing of FIG. 15.

The processing of FIG. 16 sets forth a flowchart performing a single iteration over all of the cache slots. During this single iteration, the best candidate for each family is determined. At step 402, current slot is initialized to the first slot in the current extent. Additionally, a set of one or more variables are initialized for the best candidate for each family. At step 404, a determination is made as to whether the current slot is free. If so, control proceeds to step 406 where the current slot is returned. Otherwise, if step 404 determines that the current slot is not free, control proceeds to step 405. At step 405, the tally of the number of cache slots allocated in the current extent for the family of the received data operation requesting a cache slot is incremented if the current slot belongs to the same family. This tally value may be used, for example, in processing of step 300 of FIG. 15 as described elsewhere herein in more detail. Control proceeds to step 408 where a determination is made as to whether the current slot is unavailable. If step 408 determines that the current slot is unavailable, control proceeds to step 414. If step 408 determines that the current slot is not unavailable (i.e., the current slot may be considered as a candidate), control proceeds to step 410. At step 410, a determination is made as to whether the current slot is a better candidate than the currently determined best candidate for the current slot's indicated family. It step 410 evaluates to no, control proceeds to step 414. If step 410 evaluates to yes, control proceeds to step 412 to update the best candidate for the current slot's family to be the current slot. Control then proceeds to step 414.

At step 414, a determination is made as to whether processing is complete for the current extent. If step 414 evaluates to no, control proceeds to step 418 where the current slot is assigned the next slot in the current extent. If step 414 evaluates to yes, control proceeds to step 416 to return the best candidate. It should be noted that the processing of step 416 returns the best slot candidate from all of the best candidates tabulated for each family.

The particular criteria used in connection with determining the best candidate for each family as tabulated in the processing of flowchart 400, and also determining the best candidate returned at step 416, may vary with embodiment. In connection with the techniques described herein, step 416 may be performed in accordance with the criteria and logic as described herein in connection with FIG. 15. The criteria used in connection with determining the best candidate for each family during the processing of flowchart 400 may include tracking the oldest cache slot for each family as cache slots are traversed and also the number of allocated slots in the current extent for the family of the current data operation. Subsequently, when performing step 416 in accordance with the criteria of FIG. 15, a second traversal over the slots of the current extent is not needed. The particular criteria used in step 416 may vary with embodiment. Also, the particular information tabulated during the processing of flowchart 400 may vary with the criteria used in step 416.

An embodiment may provide different initial values for use with techniques described herein with different processors, for example, such as may be associated with a DA or other director. For example, in one embodiment, when determining the starting extent, each processor may begin with the first extent of a different memory bank. As additional extents are requested by each processor, a next subsequent extent may be obtained by updating the extent pointer address by an increment value also unique for each processor. For example, in one embodiment, each processor may have its own unique extent increment value and all the extent increments of all the processors may also be relatively prime. Additionally, the number of extents may not be a multiple of any prime number that is an increment extent value. The foregoing and other techniques may be used in an embodiment to minimize clustering of different processors in which different processors are attempting to obtain cache slots which are clustered together.

In one embodiment, each director or processor may have its own unique processor identifier number. This identifier number may be used in assigning an initial value for a starting extent for each processor. For example, each processor may be assigned an initial value of a starting extent number as follows:

for I=1 to max for all processors
{
  current_proc_id=identifier of processor I;
  initial_extent_value_processor_pointer[I]=(number of extents in all banks*current_proc_id)/(max number of processors)
  I=I+1
} where I is an index over the range of all processors and each processor has an associated unique processor identifier. The initial value of a starting extent for each processor is selected in accordance with the unique processor identifier. In this embodiment, the memory may be organized into banks and number of extents in all banks refers to the total number of extents in all of the memory banks. As described elsewhere herein, each memory bank may include a particular number of extents that may vary in accordance with each embodiment. Another embodiment may use the processor identifier in connection with determining a random number used in selecting an initial value for each processor's starting extent.

In addition to selecting an initial value of a starting extent for each processor, an extent increment may be determined for how to select the next extent for each processor. In one embodiment, this increment may be the next sequential extent for each processor, for example, determined by adding a constant of one (1) to a current extent number. Other embodiments may use different techniques in determining the initial value of a starting extent and for an extent increment.

An embodiment may also utilize thresholds levels of available slots such that there is a minimum number of available slots. For example, in one embodiment, when the number of available slots (L-bit=0) falls below 20%, write pending operations are actually written to disk causing the associated cache slots to have the L-bit values cleared.

An embodiment may also use the foregoing cache management technique in a system which utilizes an alternate technique for cache management. This may be implemented, for example, utilizing a switch providing for selection of the foregoing technique or another, such as cache management using pointer manipulation.

It should be noted that the techniques described herein for specification of one or more parameters included in table 150 of FIG. 9 may be characterized as dynamic and configurable in that they may be specified during operation of the data storage system as described herein. The cache allocated and partitioned at any particular time for each family may vary in accordance with the values of the parameters. In other words, the cache partitioning per family varies in accordance with the parameter values at a particular time. Additionally, although the dynamic caching techniques described herein are illustrated with respect to a data storage system, those of ordinary skill in the art will appreciate that these techniques may be utilized in connection with other systems than as described herein.

In the event that one or more of the parameter values defined herein are updated, the copy in GM may be updated and propagated to the local copies as stored by the directors using any one of a variety of different techniques. An embodiment may associate a time stamp value with a particular copy of the parameters as stored in GM. At certain time periods, each of the directors may seek to refresh the local copy in the event the time stamp associated with the local copy is out of date with respect to the copy in GM. An embodiment may also use a messaging technique in which when there is an update to the copy in GM, a message is sent to one or more directors maintaining a local copy of the parameters.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for determining a cache slot comprising:
receiving a plurality of sets of criteria, each of said plurality of sets of criteria corresponding to one of a plurality of families, each of said plurality of families being associated with one or more applications sending data operations to a data storage system;
obtaining a received data operation associated with a first of said plurality of families; and
determining, in accordance with said criteria for said first family associated with said received data operation, whether to allocate a cache slot in said cache for said received data operation, each of said plurality of sets of said criteria corresponding to one of said plurality of families including a minimum value and a maximum value used in determining a cache partition size range for said one family, said maximum value representing a maximum cache partition size and maximum number of cache slots allowable for use with data operations associated with said one family, said minimum value representing a minimum cache partition size and minimum number of cache slots allowable for use with data operations associated with said one family.

2. The method of claim 1, further comprising:
   determining, in accordance with a type of operation associated with said received data operation and a first threshold, whether to allocate a cache slot for the received data operation, said first threshold being determined as a percentage of a minimum cache partition size determined using said minimum value for said first family.

3. The method of claim 2, wherein, said received data operation specifies a write operation.

4. The method of claim 1, wherein said criteria for each of said plurality of families further includes: a maximum usability period parameter, and a priority, said maximum usability period parameter indicating a value used in determining how long data of a cache slot remains in cache, and a priority of a family indicating a relative family priority with respect to other families.

5. The method of claim 4, wherein said cache is divided into groups of extents of cache slots, processing being performed on each of said extents to determine whether a cache slot may be obtained for use from said each extent for said received data operation, a cache slot being in one of a plurality of associated states, said associated states including a first state wherein the data in the cache slot is invalid and the cache slot is indicated as available, a second state wherein the data in the cache slot is valid and non-volatile and the cache slot is available, the method further comprising for a current extent:
   determining whether any cache slot in said current extent is in said first state;
   if no cache slot is in said first state and one or more cache slots in said current extent are in said second state, selecting a cache slot, from said one or more cache slots in said second state, in accordance with said criteria of said first family.

6. The method of claim 5, wherein a state of each cache slot is determined in accordance with a tag associated with said each cache slot, each extent including a control slot comprising tags for all cache slots in said each extent.

7. The method of claim 5, wherein, said selecting from said one or more cache slots in said current extent which are in said second state in accordance with said criteria of said first family further comprises:
   determining, in accordance with said maximum cache partition size for said first family of said received data operation, whether to allocate a cache slot for said received data operation.

8. The method of claim 7, wherein, if a number of cache slots currently allocated for said first family associated with said received data operation is not over a maximum value in accordance with said maximum cache partition size for said first family, said method further comprising:
   determining an oldest cache slot in said second state for each family;
   determining, in accordance with said maximum usability period parameter for each family, whether any oldest cache slot for each family is available for use with said received data operation.

9. The method of claim 8, wherein if one cache slot is determined as available for use in accordance with said maximum usability period parameter for each family, using said one cache slot, and if a plurality of cache slots are available in accordance with said maximum usability period parameter for each family, selecting one cache slot from said plurality of cache slots using said priority associated with each family.

10. The method of claim 8, wherein, if there are no oldest cache slots for each family available for use as determined in accordance with said maximum usability period parameter for each family, the method further comprising:
   determining which families have more cache slots currently allocated than a minimum number of cache slots associated with each family as specified using said minimum cache partition size for each family; and
   for each family having more cache slots currently allocated than said minimum number associated with each family, determining an oldest cache slot from said each family.

11. The method of claim 10, wherein, if a plurality of families currently have more than the associated family minimum number of cache slots allocated, selecting, using said priority for each family, one cache slot from the oldest cache slots as determined for each of said plurality of families.

12. The method of claim 7, wherein if a number of cache slots currently allocated for said first family associated with said received data operation is over a maximum value in accordance with said maximum cache partition size of said first family, selecting an oldest cache slot in the second state included in the first family for use with the received data operation.

13. The method of claim 1, wherein one of said criteria of at least one of said plurality of families is changed from a first value to a second different value, said first value and said second value being specified at different points in time during operation of a system utilizing said cache.

14. A computer readable medium comprising code stored thereon for determining a cache slot, the computer readable medium comprising code that:
   receives a plurality of sets of criteria, each of said plurality of sets of criteria corresponding to one of a plurality of families, each of said plurality of families being associated with one or more applications sending data operations to a data storage system;
   obtains a received data operation associated with a first of said plurality of families; and
   determines, in accordance with said criteria for said first family associated with said received data operation, whether to allocate a cache slot in said cache for said received data operation, each of said plurality of sets of said criteria corresponding to one of said plurality of families including a minimum value and a maximum value used in determining a cache partition size range for said one family, said maximum value representing a maximum cache partition size and maximum number of cache slots allowable for use with data operations associated with said one family, said minimum value representing a minimum cache partition size and minimum number of cache slots allowable for use with data operations associated with said one family.

15. The computer readable medium of claim 14, wherein, said received data operation specifies a write operation, and the computer readable medium further comprising code that:
   determines, in accordance with a type of operation associated with said received data operation and a first threshold, whether to allocate a cache slot for the received data operation, said first threshold being determined as a percentage of a minimum cache partition size determined using said minimum value of said first family.

16. The computer readable medium of claim 14, wherein said criteria for each of said plurality of families further includes: a maximum usability period parameter, and a priority, said maximum usability period parameter indicating a value used in determining how long data of a cache slot remains in cache, and a priority of a family indicating a relative family priority with respect to other families.

17. The computer readable medium of claim 16, wherein said cache is divided into groups of extents of cache slots, processing being performed on each of said extents to determine whether a cache slot may be obtained for use from said each extent for said received data operation, a cache slot being in one of a plurality of associated states, said associated states including a first state wherein the data in the cache slot is invalid and the cache slot is indicated as available, a second state wherein the data in the cache slot is valid and non-volatile and the cache slot is available, the computer readable medium further comprising code which performs for a current extent:

determining whether any cache slot in said current extent is in said first state;

if no cache slot is in said first state and one or more cache slots in said current extent are in said second state, selecting a cache slot, from said one or more cache slots in said second state, in accordance with said criteria of said first family; and wherein, said selecting from said one or more cache slots in said current extent which are in said second state in accordance with said criteria of said first family further comprises code that:

determines, in accordance with said maximum cache partition size for said first family of said received data operation, whether to allocate a cache slot for said received data operation.

18. The computer readable medium of claim 17, wherein, if a number of cache slots currently allocated for said first family associated with said received data operation is not over a maximum value in accordance with said maximum cache partition size for said first family, said computer readable medium further comprising code that:

determines an oldest cache slot in said second state for each family;

determines, in accordance with said maximum usability period parameter for each family, whether any oldest cache slot for each family is available for use with said received data operation; and wherein, if there are no oldest cache slots for each family available for use as determined in accordance with said maximum usability period parameter for each family, the computer program product further comprising code that:

determines which families have more cache slots currently allocated than a minimum number of cache slots associated with each family as specified using said minimum cache partition size for each family; and for each family having more cache slots currently allocated than said minimum number associated with each family, determines an oldest cache slot from said each family; and wherein, if a plurality of families currently have more than the associated family minimum number of cache slots allocated, selects, using said priority for each family, one cache slot from the oldest cache slots as determined for each of said plurality of families.

19. A data storage system comprising code stored on a computer-readable medium for dynamically partitioning a cache, said computer-readable medium comprising code that:

receives a set of criteria for each of one or more families, one of said one or more families being associated with each request for a cache slot, wherein, if there are no free cache slots, a cache slot is designated as a candidate for use with each request for a cache slot by making available those cache slots which include valid, non-volatile data and which are selected from one or more of the families in accordance with criteria associated with each family, said criteria for each family including: a first parameter indicating a maximum amount of cache slots included in said cache for use by said each family, a second parameter indicating a minimum amount of cache slots included in said cache for use by said each family, a third parameter specifying a maximum usability period indicating an amount of time that a cache slot including valid, non-volatile data associated with said each family remains in cache such that after said amount of time has lapsed, said cache slot may be designated as a candidate used in connection with other cache slot requests, and a priority indicating a relative family priority with respect to other families.

20. The data storage system of claim 19, wherein said data storage system includes said cache which is organized into groups of extents of cache slots, and the data storage system comprises code that:

receives a data operation request causing a request for a cache slot; and processes a first of said extents to determine whether a cache slot may be obtained for use from said first extent for said data operation request, information about the state of data associated with each cache slot is stored in a tag associated with said each slot, each of said extents including a control slot comprising tags for all cache slots in said each extent.

\* \* \* \* \*